(12) United States Patent
Tomizawa et al.

(10) Patent No.: US 9,057,652 B2
(45) Date of Patent: Jun. 16, 2015

(54) TORQUE DETECTING APPARATUS

(75) Inventors: Yasunobu Tomizawa, Saitama (JP);
Hideki Higashira, Ikoma (JP); Seiji Uematsu, Nirasaki (JP); Takeshi Ueda, Kashiba (JP); Yoshinobu Shimizu, Sakai (JP)

(73) Assignee: JTEKT CORPORATION, Osaka (JP)

( * ) Notice: Subject to any disclaimer, the term of this patent is extended or adjusted under 35 U.S.C. 154(b) by 58 days.

(21) Appl. No.: 13/984,393

(22) PCT Filed: Feb. 8, 2012

(86) PCT No.: PCT/JP2012/052897
§ 371 (c)(1),
(2), (4) Date: Aug. 8, 2013

(87) PCT Pub. No.: WO2012/108477
PCT Pub. Date: Aug. 16, 2012

(65) Prior Publication Data
US 2013/0312540 A1 Nov. 28, 2013

(30) Foreign Application Priority Data

Feb. 8, 2011 (JP) ................................ 2011-025271
Feb. 8, 2011 (JP) ................................ 2011-025272
Feb. 8, 2011 (JP) ................................ 2011-025273

(51) Int. Cl.
*G01L 3/00* (2006.01)
*G01L 3/10* (2006.01)
*B62D 6/10* (2006.01)

(52) U.S. Cl.
CPC .. *G01L 3/104* (2013.01); *B62D 6/10* (2013.01)

(58) Field of Classification Search
None
See application file for complete search history.

(56) References Cited

U.S. PATENT DOCUMENTS

| | | | |
|---|---|---|---|
| 6,564,653 B2 | 5/2003 | Desbiolles | |
| 6,837,116 B2 * | 1/2005 | Desbiolles | ............... 73/862.335 |
| 6,987,384 B2 * | 1/2006 | Uehira et al. | ............ 324/207.25 |
| 2002/0050178 A1 | 5/2002 | Desbiolles | |
| 2002/0166389 A1 | 11/2002 | Desbiolles | |

(Continued)

FOREIGN PATENT DOCUMENTS

| JP | A-2002-195897 | 7/2002 |
|---|---|---|
| JP | A-2002-350251 | 12/2002 |

(Continued)

OTHER PUBLICATIONS

Apr. 10, 2012 International Search Report issued in International Patent Application No. PCT/JP2012/052897 (with translation).

(Continued)

*Primary Examiner* — Lisa Caputo
*Assistant Examiner* — Brandi N Hopkins
(74) *Attorney, Agent, or Firm* — Oliff PLC

(57) ABSTRACT

A torque detecting apparatus detects a torque applied to a first shaft, based on a relative rotational displacement between the first shaft and a second shaft caused by torsion in a coupling shaft which couples the first shaft and the second shaft. The torque detecting apparatus includes: first and second magnets which are coupled to the first shaft and the second shaft so as to rotate together with the first shaft and second shaft, respectively; and a plurality of magnetic sensors which are disposed between the first magnet and the second magnet and which detect a rotational angle of the first shaft and a rotational angle of the second shaft.

7 Claims, 13 Drawing Sheets

(56) References Cited

U.S. PATENT DOCUMENTS

2005/0083042 A1     4/2005    Matsuura
2005/0258824 A1    11/2005    Uehira et al.

FOREIGN PATENT DOCUMENTS

| JP | A-2005-55392 | 3/2005 |
|----|----|----|
| JP | A-2005-77305 | 3/2005 |
| JP | A-2005-121501 | 5/2005 |
| JP | A-2005-265593 | 9/2005 |
| JP | A-2009-69106 | 4/2009 |
| JP | 2010-190632 A | 9/2010 |
| JP | A-2011-209143 | 10/2011 |

OTHER PUBLICATIONS

Oct. 23, 2014 Office Action issued in Japanese Application No. 2011-025271.

* cited by examiner

TORQUE DETECTING APPARATUS

TECHNICAL FIELD

The present invention relates to a torque detecting apparatus.

BACKGROUND ART

A torque detecting apparatus that is used in an electric power steering system (EPS) is designed to calculate a torque applied to an input shaft by detecting a torsional angle of a torsion bar which connects the input shaft to an output shaft.

Torque detecting apparatuses of this type have already been proposed in Patent Document 1 and Patent Document 2 below. Patent Document 1 describes a torque detecting apparatus in which an input shaft (a first shaft) and an output shaft (a second shaft) are connected together coaxially via a torsion bar (a connecting shaft). A cylindrical permanent magnet having a plurality of magnetic poles is fixed to the input shaft. Two annular magnetic yokes, which surround the permanent magnet, are fixed to the output shaft. Two magnetic flux concentrating rings are disposed around the circumference of each magnetic yoke which each have a magnetic flux concentrating portion for inducing a magnetic flux from the magnetic yoke and concentrating the induced magnetic flux. Additionally, two magnetic flux detectors are provided for detecting individually magnetic flux concentrated to each magnetic flux concentrating portion. Then, the torque applied to the input shaft is calculated based on an output signal from each magnetic flux detector.

RELATED ART DOCUMENTS

Patent Documents

Patent Document 1: JP-A-2005-265593
Patent Document 2: JP-A-2005-77305

SUMMARY OF THE INVENTION

Problem to be Solved by the Invention

In the torque detecting apparatuses described above, the two annular magnetic yokes which surround the permanent magnet needs to be disposed around the circumference of the cylindrical permanent magnet which is fixed to the input shaft. In addition, the magnetic flux concentrating rings need to be disposed around the circumference of each magnetic yoke. Therefore, the size of the torque detecting apparatus in a direction perpendicular to an axial direction of the input shaft is enlarged.

An object of the invention is to provide a torque detecting apparatus which can reduce the size of the torque detecting apparatus in a direction perpendicular to an axial direction of a first shaft.

Means for Solving the Problem

One aspect of the invention provides a torque detecting apparatus for detecting a torque applied to a first shaft, based on a relative rotational displacement between the first shaft and a second shaft caused by torsion in a coupling shaft which couples the first shaft and the second shaft, the torque detecting apparatus including: a first magnet which is coupled to the first shaft so as to rotate together with the first shaft; a second magnet which is coupled to the second shaft so as to rotate together with the second shaft; and a plurality of magnetic sensors which are disposed between the first magnet and the second magnet and which detect a rotational angle of the first shaft and a rotational angle of the second shaft.

With this configuration, the rotational angle (electric angle) of the first shaft and the rotational angle (electric angle) of the second shaft can be detected based on the output signals of the plurality of magnetic sensors. Then, the torsional angle of the coupling shaft can be calculated based on output signals of the plurality of magnetic sensors. Consequently, the torque applied to the first shaft can be calculated.

In addition, with this configuration, since the plurality of magnetic sensors are disposed between the first magnet and the second magnet, the size of the first shaft in the torque detecting apparatus in a direction perpendicular to an axial direction of the first shaft can be decreased.

MODE FOR CARRYING OUT THE INVENTION (First Embodiment)

Hereinafter, an embodiment will be described in detail by reference to the accompanying drawings in which the invention is applied to an electric power steering system.

Figure 1:
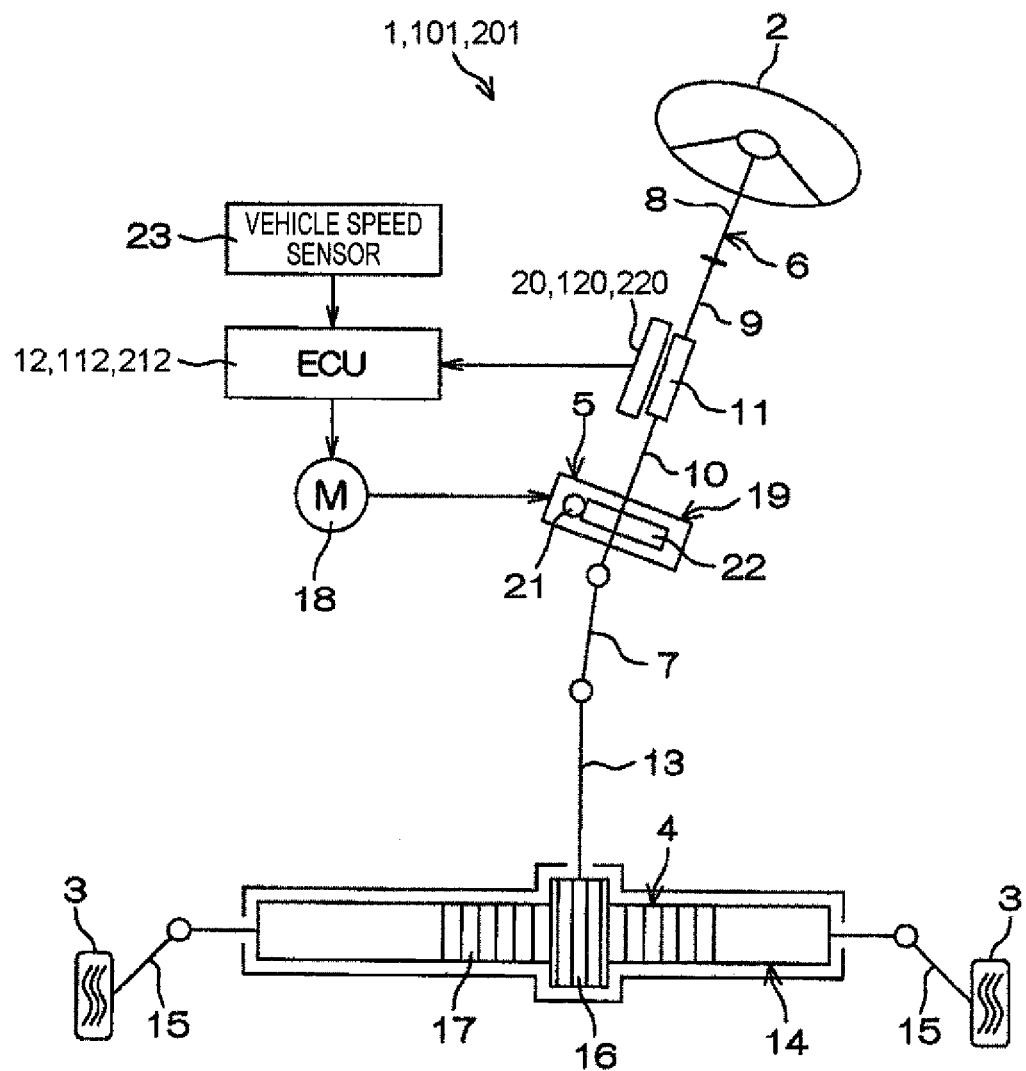
FIG. 1 is an exemplary diagram showing a schematic configuration of an electric power steering system which includes a torque detecting apparatus according to a first to third embodiments of the invention.

FIG. 1 is an exemplary diagram showing a schematic configuration of an electric power steering system which includes a torque detecting apparatus according to a first to third embodiments of the invention.

An electric power steering system 1 of this embodiment includes a wheel turning mechanism 4 which operates while interlocking with the rotation of a steering wheel 2 to turn turning wheels 3 and a steering assist mechanism 5 which assist the driver in steering or turning the steering wheel 2. The steering wheel 2 and the wheel turning mechanism 4 are mechanically coupled together via a steering shaft 6 and an intermediate shaft 7.

The steering shaft 6 includes a shaft 8 which is coupled to the steering wheel 2, an input shaft (a first shaft) 9 which is coupled to the shaft 8 so as to rotate together therewith, and an output shaft (a second shaft) 10 which is coupled to the intermediate shaft 7. The input shaft 9 and the output shaft 10 are coupled together coaxially via a torsion bar (a coupling shaft) 11 so as to rotate relatively.

A torque sensor 20 is provided on the circumference of the steering shaft 6. The torque sensor 20 detects a torque (hereinafter, referred to as a "steering torque") applied to the steering wheel 2 (the input shaft 9) based on a relative rotational displacement between the input shaft 9 and the output shaft 10 which is caused by the torsion of the torsion bar 11. As will be described later, the torque sensor 20 includes four magnetic sensors 43A, 43B, 44A, 44B (refer to FIG. 4). Output signals of the respective magnetic sensors are inputted into an ECU (Electronic Control Unit) 12 which includes a microcomputer. The ECU 12 calculates a steering torque based on the output signals of the magnetic sensors. Consequently, a torque detecting apparatus includes the torque sensor 20 and the ECU 12. In addition, a vehicle speed which is detected by a vehicle speed sensor 23 is inputted into the ECU 12.

The wheel turning mechanism 4 includes a rack and pinion mechanism which includes a pinion shaft 13 and a rack shaft 14. The turning wheels 3 are coupled to respective end portions of the rack shaft 14 via tie rods 15 and knuckle arms (whose illustration is omitted). The pinion shaft 13 is coupled to the intermediate shaft 7. A pinion 16 is coupled to a distal end (a lower end in FIG. 1) of the pinion shaft 13.

The rack shaft 14 extends rectilinearly along a transverse direction of a motor vehicle. A rack 17, which meshes with the pinion 16, is formed at an axial intermediate portion of the rack shaft 14. The rotation of the pinion shaft 13 is converted into an axial movement of the rack shaft 14 by the pinion 16 and the rack 17. Moving the rack shaft 14 in the axial direction can turn the turning wheels 3.

When the steering wheel 2 is turned (rotated), the rotation of the steering wheel 2 is transmitted to the pinion shaft 13 by way of the steering shaft 6 and the intermediate shaft 7. Then, the rotation of the pinion shaft 13 is converted into an axial movement of the rack shaft 14 by the pinion 16 and the rack 17, whereby the turning wheels 3 are turned.

The steering assist mechanism 5 includes a steering assist electric motor 18, and a speed reduction mechanism 19 which transmits an output torque of the electric motor 18 to the wheel turning mechanism 4. In this embodiment, the electric motor 18 includes a three-phase brushless motor. The speed reduction mechanism 19 includes a worm gear mechanism including a worm shaft 21 and a worm wheel 22 which meshes with the worm shaft 21. The worm shaft 21 is driven to rotate by the electric motor 18. Additionally, the worm wheel 22 is coupled so as to rotate in the same direction as a direction in which the steering shaft 6 rotates.

When the worm shaft 21 is driven to rotate by the electric motor 18, the worm wheel 22 is driven to rotate, and the steering shaft 6 rotates. Then, the rotation of the steering shaft 6 is transmitted to the pinion shaft 13 by way of the intermediate shaft 7. The rotation of the pinion shaft 13 is converted into an axial movement of the rack shaft 14, whereby the turning wheels 3 are turned. Namely, the turning wheels 3 are turned as a result of the worm shaft 21 being driven to rotate by the electric motor 18.

The electric motor 18 is controlled by the ECU 12. The ECU 12 controls the electric motor 18 based on a steering torque which is calculated based on an output signal of the torque sensor 20 and a vehicle speed which is detected by the vehicle speed sensor 23. Specifically, in the ECU 12, a target assist amount is determined by employing a map which stores relations between steering torque and target assist amount which are set for vehicle speeds, and an assist force produced by the electric motor 18 is controlled so as to approach the target assist amount.

Figure 2:
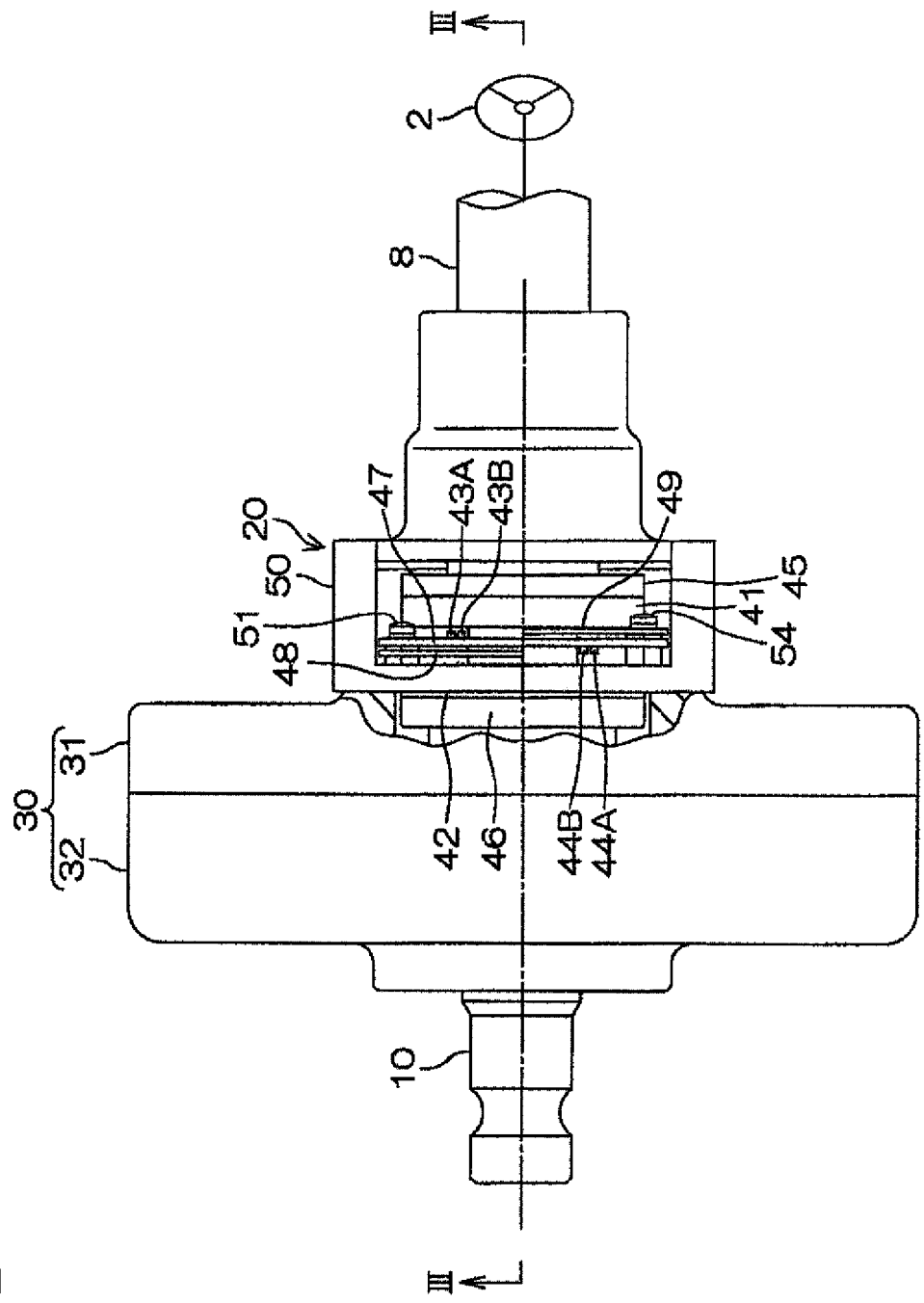
FIG. 2 is a partially cutaway plan view showing part of a torque sensor according to the first embodiment.
Figure 3:
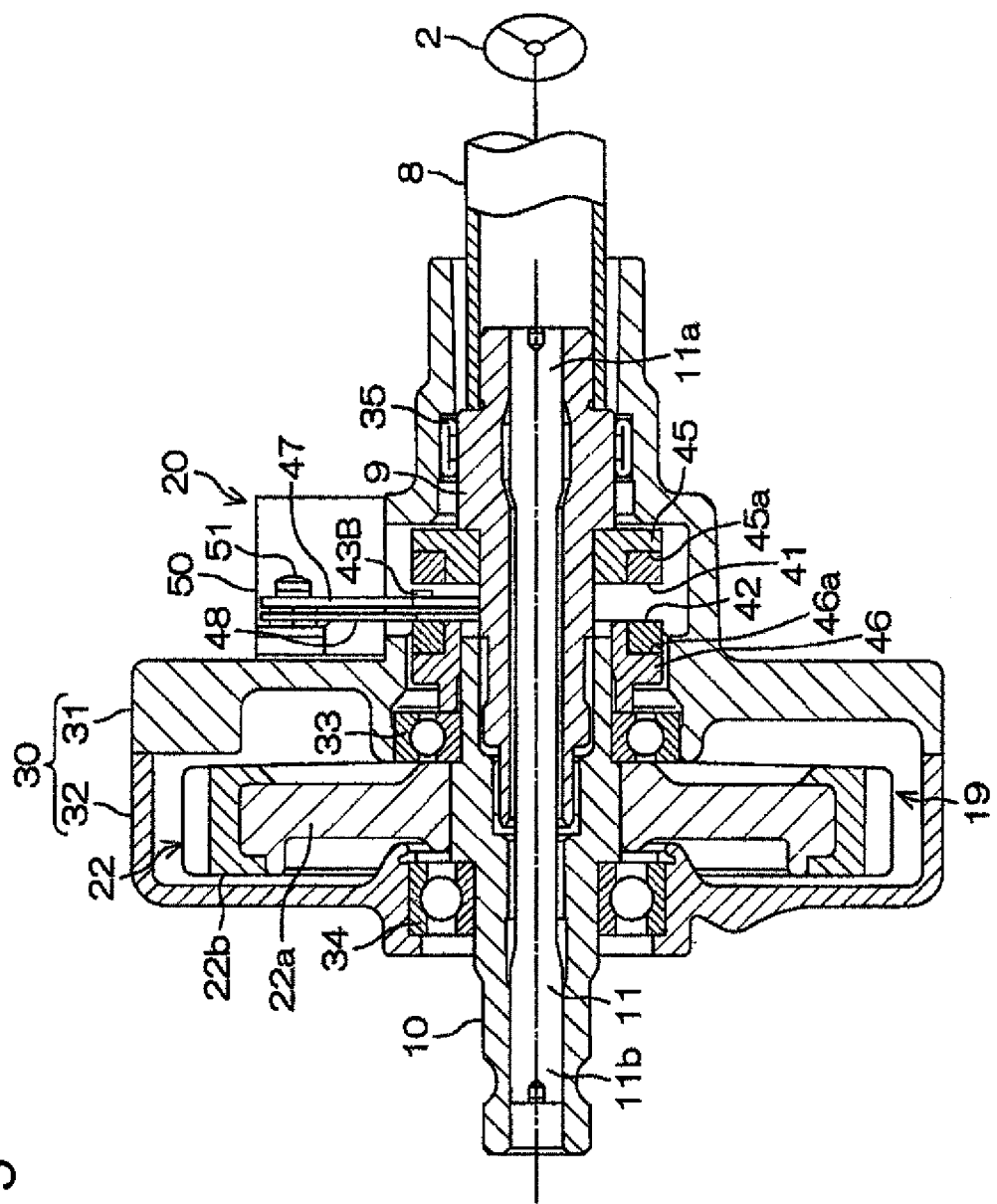
FIG. 3 is a sectional view taken along the line III-III in FIG. 2.
Figure 4:
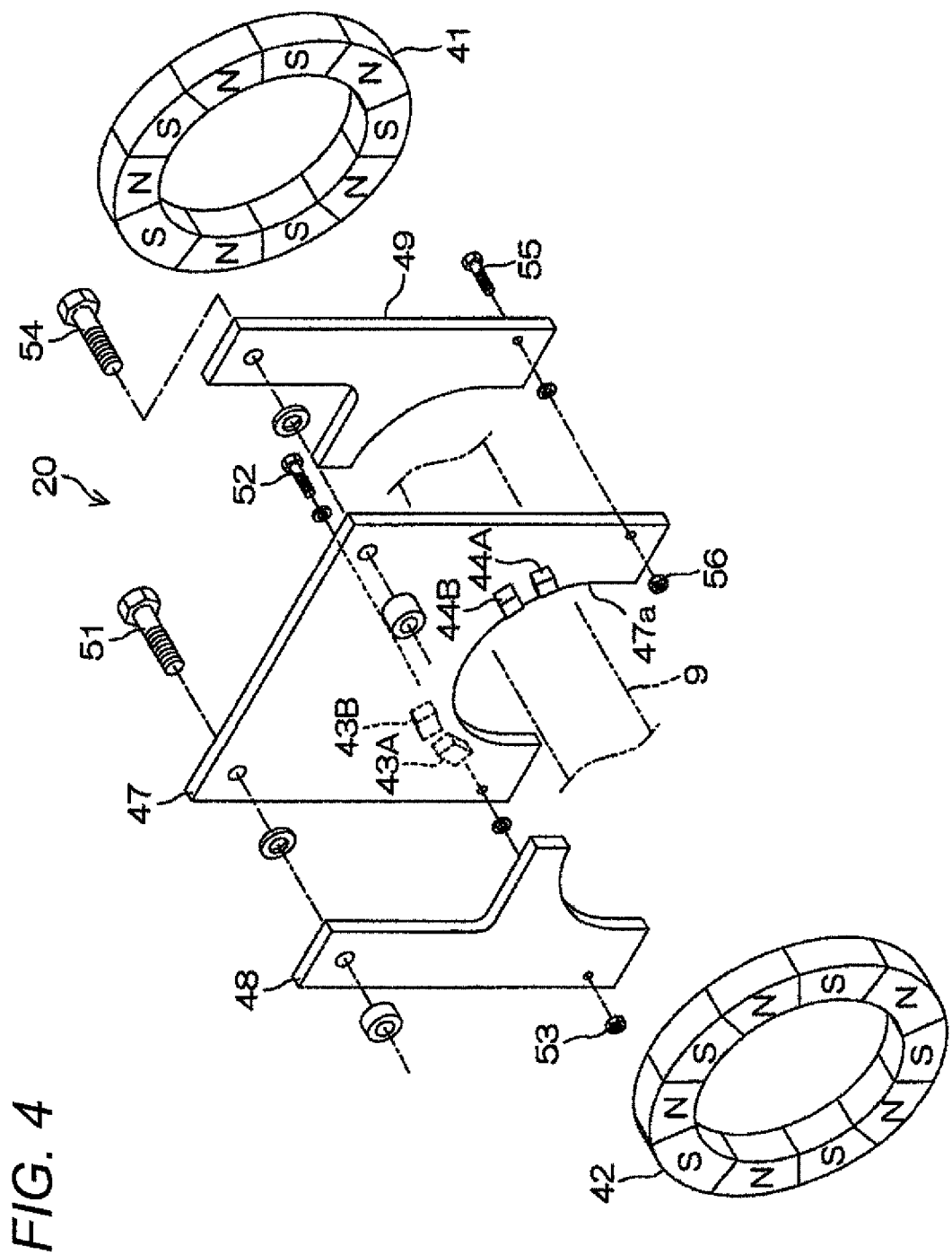
FIG. 4 is an exploded perspective view showing the torque sensor according to the first embodiment.

FIG. 2 is a partially cutaway plan view showing part of the torque sensor 20. FIG. 3 is a sectional view taken along the line III-III in FIG. 2. FIG. 4 is an exploded perspective view showing the torque sensor 20. In the following description, expressions related to upward direction denote an upper side of FIG. 3, and expressions related to downward direction denote a lower side of FIG. 3.

Referring to FIGS. 2 and 3, the input shaft 9 and the output shaft 10 are coupled together via the torsion bar 11. The input shaft 9 and the output shaft 10 are supported on a housing 30 which is attached to a vehicle body (whose illustration is omitted). The housing 30 includes a sensor housing 31 and a gear housing 32. The speed reduction mechanism 19 is accommodated in the gear housing 32. The torque sensor 20 is accommodated in the sensor housing 31.

The speed reduction mechanism 19 includes the worm wheel 22 which is coupled to an axial intermediate portion of the output shaft 10 so as to rotate together therewith and the worm shaft 21 (the illustration thereof being omitted in FIG. 3) which meshes with the worm wheel 22. The worm wheel 22 includes a core metal 22a which is coupled to the output shaft 10 so as to rotate together therewith and a synthetic resin member 22b that is formed around the core metal 22a and on an outer circumferential surface portion of which teeth are formed.

The output shaft 10 is supported rotatably in the sensor housing 31 and the gear housing 32 via a pair of rolling bearings 33, 34 which are disposed across the worm wheel 22. The input shaft 9 is supported rotatably in the sensor housing 31 via a rolling bearing 35.

The torsion bar 11 penetrates the input shaft 9 and the output shaft 10. One end 11a of the torsion bar 11 is coupled to the input shaft 9 so as to rotate together therewith. The other end 11b of the torsion bar 11 is coupled to the output shaft 10 so as to rotate together therewith. The shaft 8 to which the steering wheel 2 is coupled is coupled to the input shaft 9 so as to rotate together therewith. The intermediate shaft 7 (the illustration thereof being omitted in FIG. 3) is coupled to the output shaft 10 so as to rotate together therewith.

Referring to FIGS. 2 to 4, the torque sensor 20 includes a first annular magnet 41 which is coupled to the input shaft 9 so as to rotate together therewith, a second annular magnet 42 which is coupled to the output shaft 10 so as to rotate together therewith and which faces the first magnet 41, a first magnetic sensor 43A and a second magnetic sensor 43B that are disposed between both the magnets 41, 42 and which detect a rotational angle (an electrical angle) of the input shaft 9, and a third magnetic sensor 44A and a fourth magnetic sensor 44B that are disposed between both the magnets 41, 42 and which detect a rotational angle (an electrical angle) of the output shaft 10. In this embodiment, Hall elements are used as the magnetic sensors 43A, 43B, 44A, 44B.

A short-cylindrical first magnet fixture 45 is fixed to and fitted in an outer circumferential surface of the input shaft 9. A short-cylindrical second magnet fixture 46 is fixed to and fitted in the output shaft 10. The first magnet fixture 45 and the second magnet fixture 46 are disposed so as to face each other at a relatively short interval in an axial direction of the input shaft 9.

An annular cutout portion 45a is formed at an outer circumferential edge portion of an annular end face of the first magnet fixture 45 which faces the second magnet fixture 46. An annular cutout portion 46a is formed at an outer circumferential edge portion of an annular end face of the second magnet fixture 46 which faces the first magnet fixture 45.

The first magnet 41 and the second magnet 42 are identical in shape, which is annular, and size and each have 10 magnetic poles (five pairs of magnetic poles) magnetized thereto. The first magnet 41 is fixed to the first magnet fixture 45 in a state in which it fits on the annular cutout portion 45a of the first magnet fixture 45. The second magnet 42 is fixed to the second magnet fixture 46 in a state in which it fits on the annular cutout portion 46a of the second magnet fixture 46.

A sensor mounting base plate 47 is disposed between the first magnet 41 and the second magnet 42. In addition, a first magnetic blocking member 48 is disposed between the sensor mounting base plate 47 and the second magnet 42, and a second magnetic blocking member 49 is disposed between the sensor mounting base plate 47 and the first magnet 41.

The sensor mounting base plate 47 has a substantially rectangular shape as viewed from the axial direction of the input shaft 9, and a substantially semi-circular cutout portion 47a is formed in a lower portion thereof so as to allow the input shaft 9 to pass therethrough. The first magnetic sensor 43A and the second magnetic sensor 43B are mounted on a first surface of the sensor mounting base plate 47 which faces the first magnet 41. The third magnetic sensor 44A and the fourth magnetic sensor 44B are mounted on a second surface of the sensor mounting base plate 47 which faces the second magnet 42. Namely, the first to fourth magnetic sensors 43A, 43B, 44A, 44B are disposed between the first magnet 41 and the second magnet 42 (within a space sandwiched by the first magnet 41 and the second magnet 42).

When the second magnet 42 is viewed from the side of the first magnet 41, the first and second magnetic sensors 43A, 43B are disposed rightwards of a widthwise center of the sensor mounting base plate 47, and the third and fourth magnetic sensors 44A, 44B are disposed leftwards of the widthwise center of the sensor mounting base plate 47. Specifically, when the second magnet 42 is viewed from the side of the first magnet 41, the first magnetic sensor 43A and the third magnetic sensor 44A are disposed laterally symmetrical with respect to an imaginary line which extends vertically while passing through the widthwise center of the sensor mounting base plate 47, and the second magnetic sensor 43B and the fourth magnetic sensor 44B are disposed laterally symmetrical with respect to the imaginary line.

Figure 5:
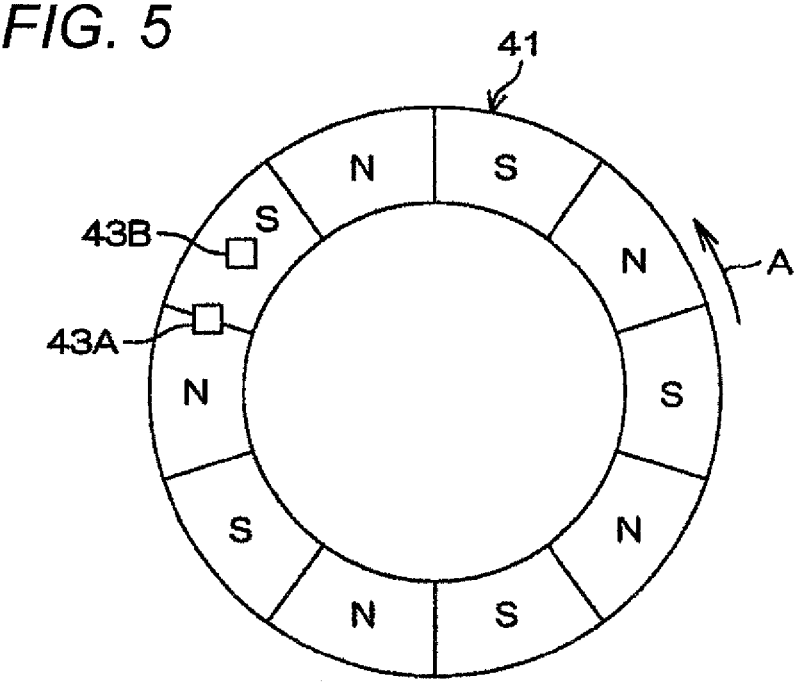
FIG. 5 is an exemplary diagram showing a positional relation between first and second magnetic sensors and a first magnet when the first magnet is viewed from the side of a sensor mounting base plate in a state in which a steering wheel is in a neutral position and no steering torque is applied to an input shaft in the electric power steering system including the torque sensor according to the first embodiment.
Figure 6:
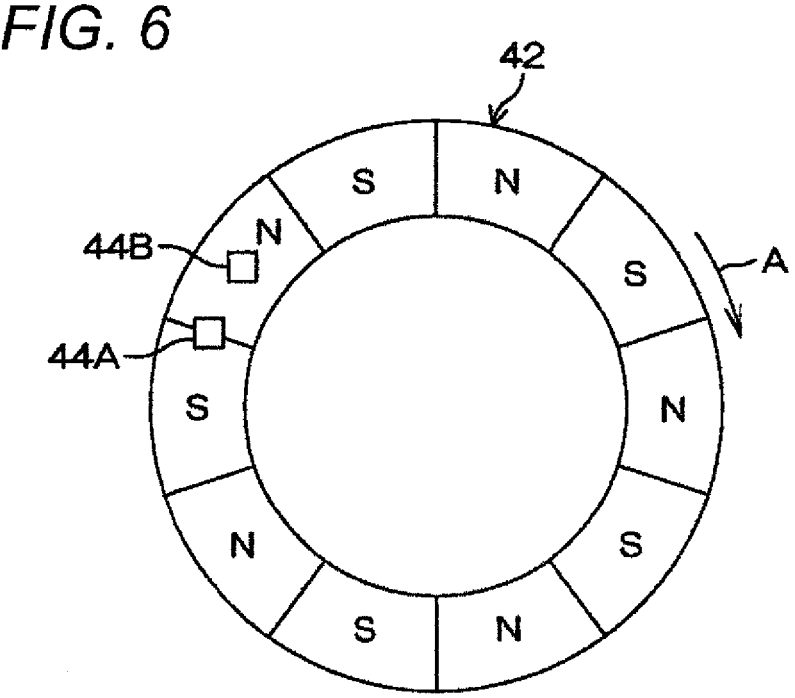
FIG. 6 is an exemplary diagram showing a positional relation between third and fourth magnetic sensors and a second magnet when the second magnet is viewed from the side of the sensor mounting base plate in a state in which the steering wheel is in the neutral position and no steering torque is applied to the input shaft in the electric power steering system including the torque sensor according to the first embodiment.

When the first magnet 41 is viewed from the side of the sensor mounting base plate 47, as shown in FIG. 5, the first magnetic sensor 43A and the second magnetic sensor 43B are disposed apart from each other at an angular interval of 90 degrees in terms of electrical angle in a position which faces a top left portion of the first magnet 41. On the other hand, when the second magnet 42 is viewed from the side of the sensor mounting base plate 47, as shown in FIG. 6, the third magnetic sensor 44A and the fourth magnetic sensor 44B are disposed apart from each other at an angular interval of 90 degrees in terms of electrical angle in a position which faces a top left portion of the second magnet 42.

The first magnetic blocking member 48 blocks magnetic flux directed from the second magnet 42 towards the first and second magnetic sensors 43A, 43B. When the second magnet 42 is viewed from the side of the first magnet 41, the first magnetic blocking member 48 has a shape formed by cutting a top left portion from a right half portion of the sensor mounting base plate 47.

The second magnetic blocking member 49 blocks magnetic flux directed from the first magnet 41 towards the third and fourth magnetic sensors 44A, 44B. When the second magnet is viewed from the side of the first magnet 41, the second magnetic blocking member 49 has a shape formed by cutting a top right portion from a left half portion of the sensor mounting base plate 47.

The first magnetic blocking member 48 is mounted on the sensor mounting base plate 47 with bolts 51, 52 and nuts 53. Additionally, the second magnetic blocking member 49 is mounted on the sensor mounting base plate 47 with bolts 54, 55 and nuts 56. The sensor mounting base plate 47, the first magnetic blocking member 48 and the second magnetic blocking member 49 are mounted on a base plate fixture 50 which is supported on the sensor housing 31 with the bolts 51, 54.

A detection method for detecting a steering torque by the torque sensor 20 and the ECU 12 will be described.

FIG. 5 is an exemplary diagram showing a positional relation between the first and second magnetic sensors 43A, 43B and the first magnet 41 when the first magnet 41 is viewed from the side of the sensor mounting base plate 47 in a state in which the steering wheel 2 is in a neutral position and no steering torque is applied to the steering wheel 2. FIG. 6 is an exemplary diagram showing a positional relation between the third and fourth magnetic sensors 44A, 44B and the second magnet 42 when the second magnet 42 is viewed from the side of the sensor mounting base plate 47 in a state in which the steering wheel 2 is in the neutral position and no steering torque is applied to the steering wheel 2.

In this embodiment, the first magnet 41 and the second magnet 42 are fixed to the input shaft 9 and the output shaft 10, respectively, so that north magnetic poles of the first magnet 41 and north magnetic poles of the second magnet 42 face each other in a state in which the steering wheel 2 is in the neutral position and no steering torque is applied to the steering wheel 2. Consequently, in a state in which no torsion is generated in the torsion bar 11, the north magnetic poles of the first magnet 41 and the north magnetic poles of the second magnet 42 face each other.

When the input shaft 9 rotates clockwise when viewed from the side of the steering wheel 2, the first magnet 41 and the second magnet 42 also rotate clockwise in association with the clockwise rotation of the input shaft 9. In this case, when the first magnet 41 is viewed from the side of the first and second magnetic sensors 43A, 43B, the first magnet 41 rotates in a direction indicated by an arrow A in FIG. 5 (counterclockwise). On the other hand, when the second magnet 42 is viewed from the side of the third and fourth magnetic sensors 44A, 44B, the second magnet 42 rotates in a direction indicated by an arrow A in FIG. 6 (clockwise). Then, assuming that the directions indicated by the arrows A in FIGS. 5 and 6 represent a forward direction, it is understood that when the magnets 41, 42 are rotated in the forward direction, the rotational angles of the respective magnets 41, 42 increase, while when the magnets 41, 42 are rotated in a reverse direction, the rotational angles of the respective magnets 41, 42 decrease.

Since the first and second magnetic sensors 43A, 43B are prevented from being affected by the magnetic flux from the second magnet 42 by the first magnetic blocking member 48, the first and second magnetic sensors 43A, 43B are affected only by the magnetic flux from the first magnet 41. When the first magnet 41 is rotated, sine-wave signals whose phases shift 90 degrees from each other are outputted from the first magnetic sensor 43A and the second magnetic sensor 43B by magnetic flux generated from the magnetic poles of the first magnet 41. Here, assuming that the rotational angle (the electrical angle) of the first magnet 41 is $\theta 1$, it is understood that a first output signal V1, which is represented by V1=sin $\theta 1$, is outputted from the first magnetic sensor 43A, and a second output signal V2, which is represented by V2=cos $\theta 1$, is outputted from the second magnetic sensor 43B. The rotational angle (the electrical angle) $\theta 1$ of the first magnet 41 is expressed by the following expression (1).

$$\theta 1 = \tan^{-1}(V1/V2) \quad (1)$$

In a state in which the steering wheel 2 is in the neutral position and no steering torque is applied to the steering wheel 2, a rotational angle (an electrical angle) of the first magnet 41 which is calculated from the first and second output signals V1, V2 is determined as a first reference electrical angle $\theta 1o$. The first reference electrical angle $\theta 1o$ is stored in a non-volatile memory of the ECU 12.

Since the third and fourth magnetic sensors 44A, 446 are prevented from being affected by the magnetic flux from the first magnet 41 by the second magnetic blocking member 49, the third and fourth magnetic sensors 44A, 44B are affected only by the magnetic flux from the second magnet 42. When the second magnet 42 is rotated, sine-wave signals whose phases shift 90 degrees from each other are outputted from the third magnetic sensor 44A and the fourth magnetic sensor 44B by magnetic flux generated from the magnetic poles of the second magnet 42. Here, assuming that the rotational angle (the electrical angle) of the second magnet 42 is $\theta 2$, a third output signal V3, which is represented by V3=sin $\theta 2$, is outputted from the third magnetic sensor 44A, and a fourth output signal V4, which is represented by V4=cos $\theta 2$, is outputted from the fourth magnetic sensor 44B.

The rotational angle (the electrical angle) $\theta 2$ of the second magnet 42 is expressed by the following expression (2).

$$\theta 2 = \tan^{-1}(V3/V4) \quad (2)$$

In a state in which the steering wheel 2 is in the neutral position and no steering torque is applied to the steering wheel 2, a rotational angle (an electrical angle) of the second magnet 42 which is calculated from the third and fourth output signals V3, V4 is determined as a second reference electrical angle $\theta 2o$. The second reference electrical angle $\theta 2o$ is stored in the non-volatile memory of the ECU 12.

The ECU 12 calculates the rational angle (electrical angle) $\theta 1$ of the first magnet 41 from the first and second output signals V1, V2 and calculates a first electrical angle deviation $\Delta\theta 1$ (=$\theta 1-\theta 1o$) by subtracting the first reference electrical angle $\theta 1o$ from the obtained rotational angle (electrical angle) $\theta 1$. The first electrical angle deviation $\Delta\theta 1$ constitutes a rotational angle (electrical angle) of the input shaft 9 when assuming that the rotational angle (electrical angle) of the input shaft 9 in the neutral position is a reference (0°).

In addition, the ECU 12 calculates the rational angle (electrical angle) $\theta 2$ of the second magnet 42 from the third and fourth output signals V3, V4 and calculates a second electrical angle deviation $\Delta 2\theta$ (=$\theta 2-\theta 2o$) by subtracting the second reference electrical angle $\theta 2o$ from the obtained rotational angle (electrical angle) $\theta 2$. The second electrical angle deviation $\Delta\theta 2$ constitutes a rotational angle (electrical angle) of the output shaft 10 when assuming that the rotational angle (electrical angle) of the output shaft 10 in the neutral position is a reference (0°).

Since no torsion is generated in the torsion bar 11 when no steering torque is applied to the input shaft 9, a rotational angle of the input shaft 9 from the neutral position and a rotational angle of the output shaft 10 from the neutral position are equal. Consequently, in this case, the first electrical angle deviation $\Delta\theta 1$ and the second electrical angle deviation $\Delta\theta 2$ become equal.

On the other hand, since torsion is generated in the torsion bar 11 when a steering torque is applied to the input shaft 9, an angle difference according to a torsional angle $\gamma$ of the torsion bar 11 is generated between the rotational angle of the input shaft 9 from the neutral position and the rotational angle of the output shaft 10 from the neutral position. An absolute value of a maximum value of the torsional angle $\gamma$ [deg] of the torsion bar 11 is smaller than a mechanical angle of 72 [deg] which corresponds to 360° in terms of electrical angle. Consequently, in this case, an angle difference according to the torsional angle $\gamma$ of the torsion bar 11 is generated between the first electrical angle deviation $\Delta\theta 1$ and the second electrical angle deviation $\Delta\theta 2$.

Then, the ECU 12 subtracts the second electrical angle deviation $\Delta\theta 2$ from the first electrical angle deviation $\Delta\theta 1$ and calculates the torsional angle $\gamma$ of the torsion bar 11 from the results of the subtraction. Specifically, the ECU 12 calculates the torsional angle (mechanical angle) $\gamma$ of the torsion bar 11 based on the following expression (3).

$$\gamma = (\Delta\theta 1 - \Delta\theta 2)/5 \quad (3)$$

"5" in the expression (3) above represents the number of pairs of magnetic poles provided in each of the magnets 41, 42.

Finally, the ECU 12 calculates a steering torque T by multiplying the torsional angle $\gamma$ by a spring constant K of the torsion bar 11. Namely, the ECU 12 calculates a steering torque T based on the following expression (4).

$$T = \gamma \times K = \{(\Delta\theta 1 - \Delta\theta 2)/5\} \times K \quad (4)$$

The ECU 12 performs a calculation like the one described above every predetermined calculation cycle to calculate a steering torque T every calculation cycle.

In the embodiment, the first to fourth magnetic sensors 43A, 43B, 44A, 44B are disposed between the first magnet 41 which is coupled to the input shaft 9 so as to rotate together therewith and the second magnet 42 which is coupled to the output shaft 10 so as to rotate together therewith. Consequently, the size of the input shaft 9 in the torque sensor 11 in a direction perpendicular to the axial direction thereof can be decreased.

In addition, since the first and second magnetic sensors 43A, 43B detect the rotational angle of the input shaft 9 based on the magnetic flux from the first magnet 41, it is preferable that the first and second magnetic sensors 43A, 43B are not affected by the magnetic flux from the second magnet 42. Similarly, since the third and fourth magnetic sensors 44A, 44B detect the rotational angle of the output shaft 10 based on the magnetic flux from the second magnet 42, it is preferable that the third and fourth magnetic sensors 44A, 44B are not affected by the magnetic flux from the first magnet 41. Then, it is considered that the space between the first and second magnetic sensors 43A, 43B and the second magnet 42 is increased and the space between the third and fourth magnetic sensors 44A, 44B and the first magnet 41 is increased. However, when the spaces are increased, the axial size of the input shaft 9 in the torque sensor 11 is increased.

In the embodiment, the first magnetic blocking member 48 which blocks the magnetic flux directed from the second magnet 42 to the first and second magnetic sensors 43A, 43B is disposed between the first and second magnetic sensors 43A, 43B and the second magnet 42. By disposing the first magnetic blocking member 48 in this way, the space between the first and second magnetic sensors 43A, 43B and the second magnet 42 can be decreased. In addition, the second magnetic blocking member 49 which blocks the magnetic flux directed from the first magnet 41 to the third and fourth magnetic sensors 44A, 44B is disposed between the third and fourth magnetic sensors 44A, 44B and the first magnet 41. By disposing the second magnetic blocking member 49 in this way, the space between the third and fourth magnetic sensors 44A, 44B and the first magnet 41 can be decreased. Consequently, the axial size of the input shaft 9 in the torque sensor 11 can be decreased.

Additionally, in the embodiment described above, the first and second magnetic sensors 43A, 43B which detect the rotational angle of the input shaft 9 are mounted on the one surface (the first surface), and the third and fourth magnetic sensors 44A, 44B which detect the rotational angle of the output shaft 10 are mounted on the other surface (the first surface) of the sensor mounting base plate 47. By adopting this configuration, there is provided only the single base plate on which the magnetic sensors are to be mounted, thereby making it possible to realize a reduction in production cost.

The magnets 41, 42 and the magnetic sensors 43A, 43B, 44A, 44B may be assembled together so that the electrical angle $\theta 1$ of the first magnet 41 which is calculated by the first and second magnetic sensors 43A, 43B and the electrical angle $\theta 2$ of the second magnet 42 which is calculated by the third and fourth magnetic sensors 44A, 44B become equal when no torsion is generated in the torsion bar 11. As this occurs, the torsional angle $\gamma$ of the torsion bar 11 can be calculated based on $\gamma=(\theta 1 - \theta 2)/5$. Namely, as this occurs, the first reference electrical angle $\theta 1 o$ and the second reference electrical angle $\theta 2 o$ become unnecessary.

(Second Embodiment)

Next, a torque detecting apparatus according to a second embodiment of the invention will be described by reference to FIG. 1 and FIGS. 7 to 11.

As shown in FIG. 1, an electric power steering system 101 which includes a torque detecting apparatus of this embodiment includes an ECU 112 and a torque sensor 120. In FIG. 1, since the other configurations than the ECU 112 and the torque sensor 120 are similar to the other configurations than the ECU 12 and the torque sensor 20 of the electric power steering system 1 according to the first embodiment, like reference numerals will be given to like elements, and the description thereof will be omitted.

The torque sensor 120 is provided on the circumference of a steering shaft 6. The torque sensor 120 detects a steering torque applied to a steering wheel 2 (an input shaft 9) based on a relative rotational displacement between the input shaft 9 and an output shaft 10 which is caused by the torsion of a torsion bar 11. As will be described later, the torque sensor 120 includes four magnetic sensors 143A, 143B, 144A, 144B (refer to FIG. 9). Output signals of the respective magnetic sensors are inputted into the ECU (Electronic Control Unit) 112 which includes a microcomputer. The ECU 112 calculates a steering torque based on the output signals of the magnetic sensors. Consequently, the torque detecting apparatus includes the torque sensor 120 and the ECU 112. In addition, a vehicle speed which is detected by a vehicle speed sensor 23 is inputted into the ECU 112.

An electric motor 18 is controlled by the ECU 112. The ECU 112 controls the electric motor 18 based on a steering torque which is calculated based on an output signal of the torque sensor 120 and a vehicle speed which is detected by the vehicle speed sensor 23. Specifically, in the ECU 112, a target assist amount is determined by employing a map which stores relations between steering torque and target assist amount which are set for vehicle speeds, and an assist force produced by the electric motor 18 is controlled so as to approach the target assist amount.

Figure 7:
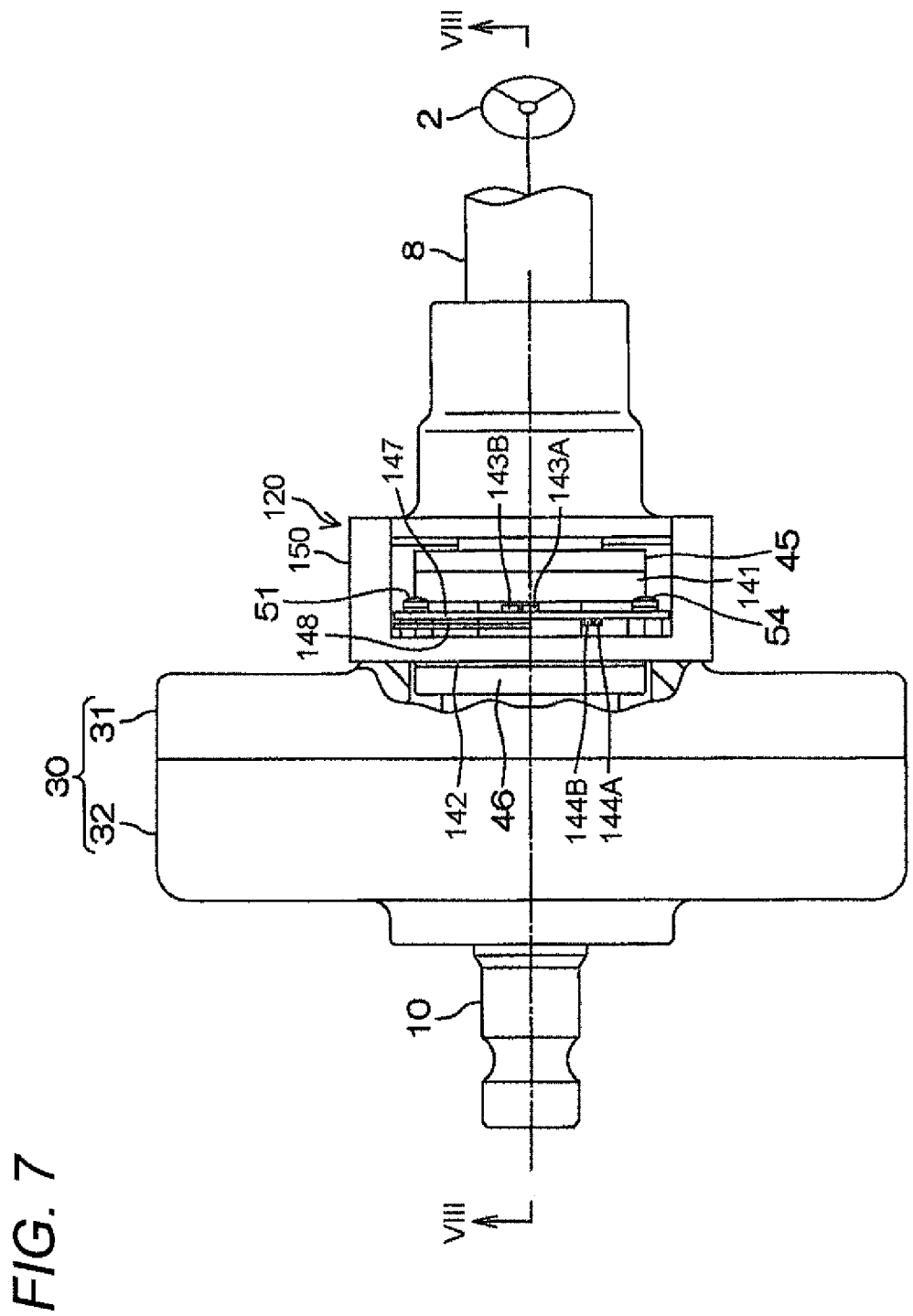
FIG. 7 is a partially cutaway plan view showing part of a torque sensor according to a second embodiment of the invention.
Figure 8:
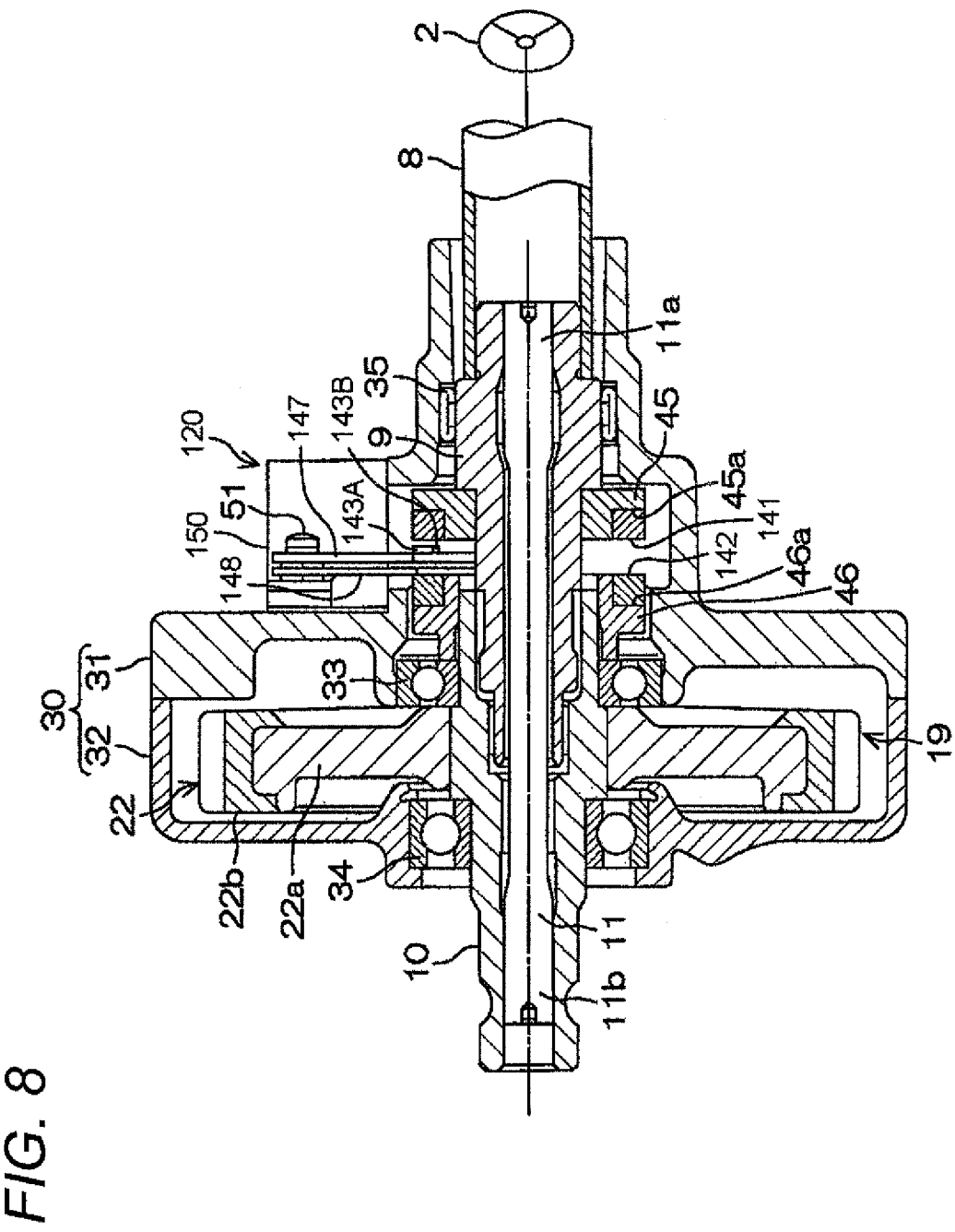
FIG. 8 is a sectional view taken along the line VIII-VIII in FIG. 7.
Figure 9:
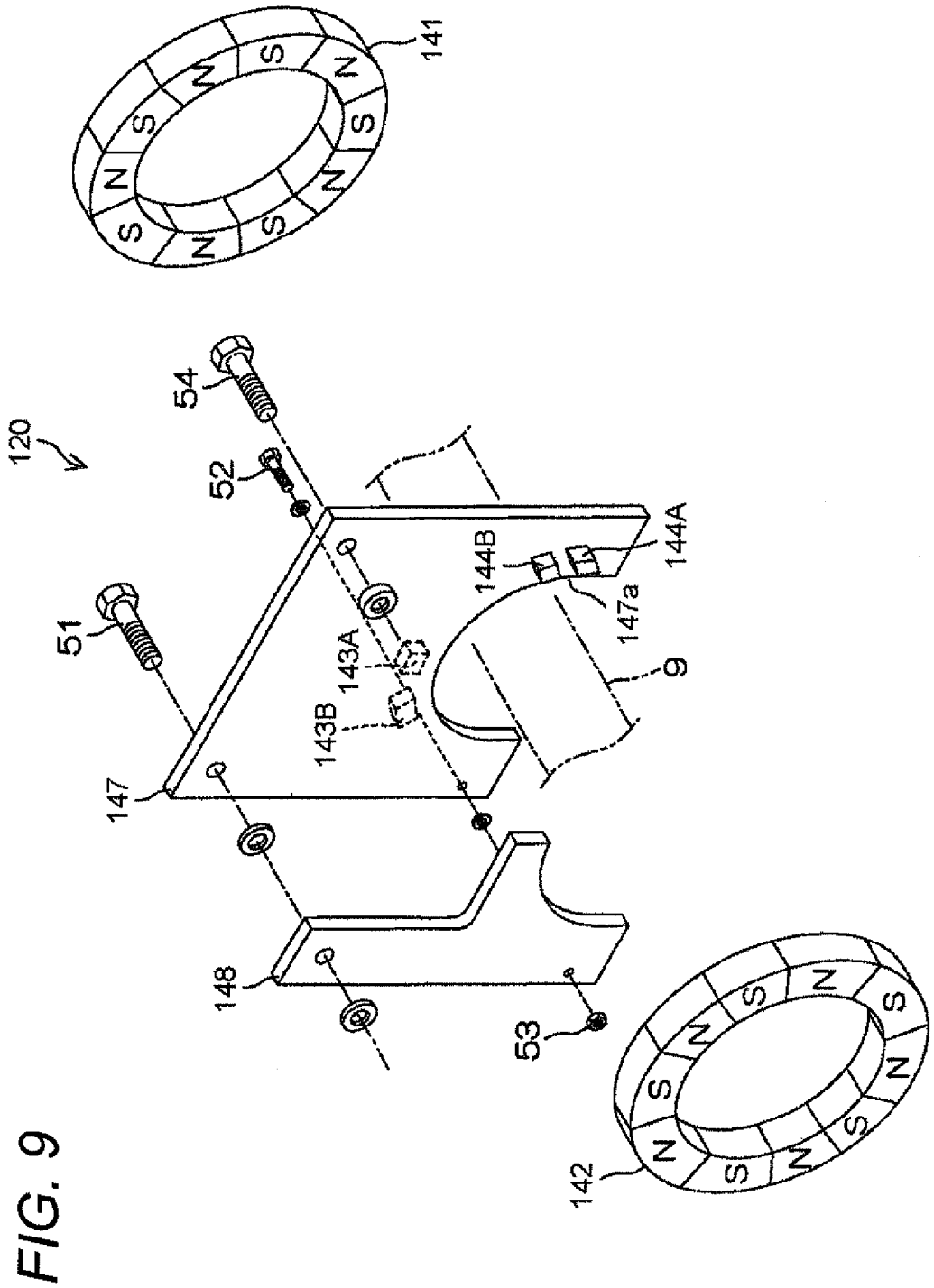
FIG. 9 is an exploded perspective view showing the torque sensor according to the second embodiment.

FIG. 7 is a partially cutaway plan view showing part of the torque sensor 120. FIG. 8 is a sectional view taken along the line VIII-VIII in FIG. 7. FIG. 9 is an exploded perspective view showing the torque sensor 120. In the following description, expressions related to upward direction denote an upper side of FIG. 8, and expressions related to downward direction denote a lower side of FIG. 8.

Referring to FIGS. 7 and 8, the torque sensor 120 is accommodated in a sensor housing 31 as so done in the first embodiment. The torque sensor 120 of this embodiment differs from the torque sensor 20 of the first embodiment mainly in that the second magnetic blocking member 49 in the first embodiment is not provided in the torque sensor 120. Hereinafter, the torque sensor 120 of this embodiment will be described in detail.

Referring to FIGS. 7 to 9, the torque sensor 120 includes a first annular magnet 141 which is coupled to the input shaft 9 so as to rotate together therewith, a second annular magnet 142 that is coupled to the output shaft 10 so as to rotate together therewith and which faces the first magnet 141, a first magnetic sensor 143A and a second magnetic sensor 143B which are disposed between both the magnets 141, 142 for detecting an input shaft rotational angle, and a third magnetic sensor 144A and a fourth magnetic sensor 144B which are disposed between both the magnets 141, 142 for detecting an output shaft rotational angle. In this embodiment, Hall elements are used as the magnetic sensors 143A, 143B, 144A, 144B.

Figure 10:
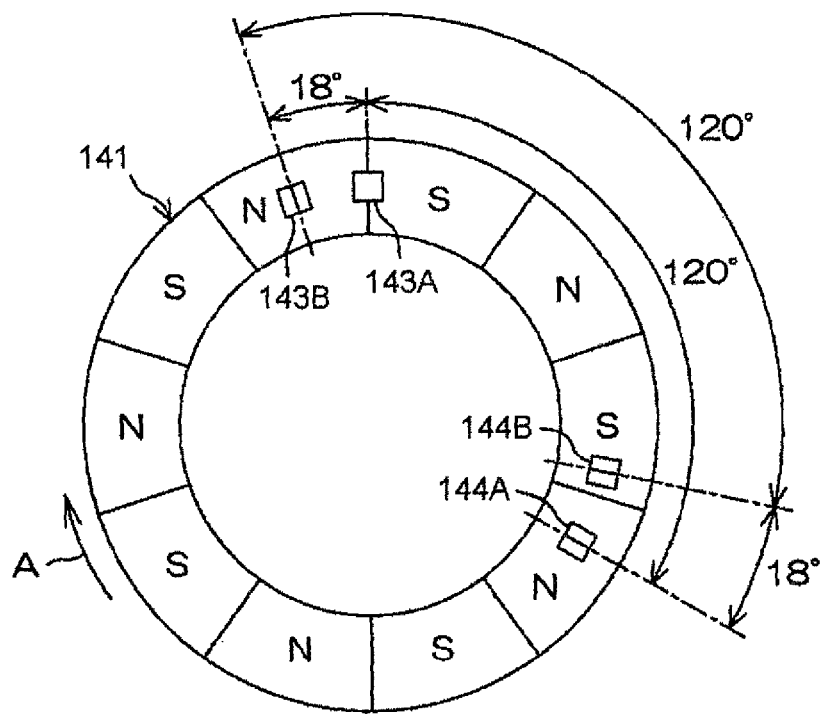
FIG. 10 is an exemplary diagram showing a positional relation between first to fourth magnetic sensors and a first magnet when the first magnet is viewed from the side of a second magnet in a state in which a steering wheel is in a neutral position and no steering torque is applied to an input shaft in an electric power steering system including the torque sensor according to the second embodiment.
Figure 11:
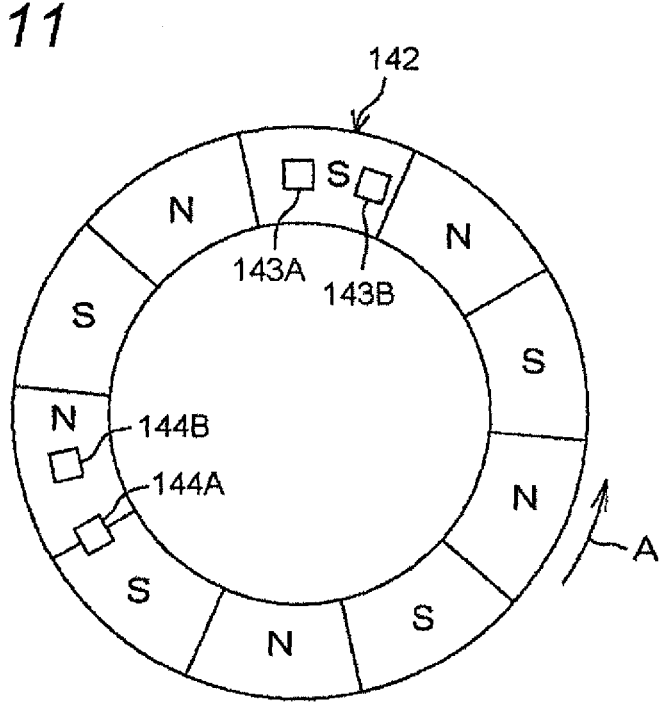
FIG. 11 is an exemplary diagram showing a positional relation between the first to fourth magnetic sensors and the second magnet when the second magnet is viewed from the side of the first magnet in a state in which the steering wheel is in the neutral position and no steering torque is applied to the input shaft in the electric power steering system including the torque sensor according to the second embodiment.

The first magnet 141 and the second magnet 142 have the same configurations as those of the first magnet 41 and the second magnet 42 in the first embodiment. However, as shown in FIGS. 10 and 11, the first magnet 141 and the second magnet 142 are fixed to a first magnet fixture 45 and a second magnet fixture 46, respectively, so that relative positions of respective magnetic poles of the first magnet 141 and the second magnet 142 differ from those of the first embodiment in a state in which the steering wheel 2 is in a neutral position and no steering torque is applied to the steering wheel 2.

A sensor mounting base plate 147 is disposed between the first magnet 141 and the second magnet 142. In addition, a magnetic blocking member 148 is disposed between the sensor mounting base plate 147 and the second magnet 142. The sensor mounting base plate 147 has the same shape as that of the sensor mounting base plate 47 in the first embodiment. As has been described above, however, the torque sensor 120 of this embodiment does not have the second magnetic blocking member 49 of the first embodiment. Therefore, the sensor mounting base plate 147 may be provided without the holes provided in the sensor mounting base plate 47 of the first embodiment through which the bolts are inserted to mount the second magnetic blocking member 49.

The sensor mounting base plate 147 has a substantially rectangular shape as viewed from the axial direction of the input shaft 9, and a substantially semi-circular cutout portion 147a is formed in a lower portion thereof so as to allow the input shaft 9 to pass therethrough. The first magnetic sensor 143A and the second magnetic sensor 143B are mounted on a first surface of the sensor mounting base plate 147 which faces the first magnet 141. The third magnetic sensor 144A and the fourth magnetic sensor 144B are mounted on a second surface of the sensor mounting base plate 147 which faces the second magnet 142. Namely, the first to fourth magnetic sensors 143A, 143B, 144A, 144B are disposed between the first magnet 141 and the second magnet 142 (within a space sandwiched by the first magnet 141 and the second magnet 142).

The magnetic sensors 143A, 143B, 144A, 144B are disposed around the circumference of the cutout portion 147a in the sensor mounting base plate 147. Specifically, as shown in FIGS. 9 and 10, when the first magnet 141 is viewed from the side of the second magnet 142, the first magnetic sensor 143A is disposed at a widthwise center of the sensor mounting base plate 147 on the circumference of the cutout portion 147a in the sensor mounting base plate 147. The second magnetic sensor 143B is disposed apart an angular space of 18° in terms of mechanical angle (90° in terms of electrical angle) in a counterclockwise direction from the first magnetic sensor 143A.

The third magnetic sensor 144A is disposed apart an angular space of 120° in terms of mechanical angle (600° in terms of electrical angle) in a clockwise direction from the first magnetic sensor 143A. The fourth magnetic sensor 144B is disposed apart the angular space of 120° in terms of mechanical angle (600° in terms of electrical angle) in the clockwise direction from the second magnetic sensor 143B. Consequently, the fourth magnetic sensor 144B is disposed apart the angular space of 18° in terms of mechanical angle (90° in terms of electrical angle) in the counterclockwise direction from the third magnetic sensor 144A.

A space between the first magnet 141 and the first magnetic sensor 143A and the second magnetic sensor 143B is equal to a space between the second magnet 142 and the third magnetic sensor 144A and the fourth magnetic sensor 144B.

The magnetic blocking member 148 has the same configuration as that of the first magnetic blocking member 48 of the first embodiment and is configured to block magnetic flux directed from the second magnet 142 towards the first and second magnetic sensors 143A, 143B. When the first magnet 141 is viewed from the side of the second magnet 142, the magnetic blocking member 148 has a shape formed by cutting a top right portion from a left half portion of the sensor mounting base plate 147.

The magnetic blocking member 148 is mounted on the sensor mounting base plate 147 with bolts 51, 52 and nuts 53. The sensor mounting base plate 147 and the magnetic blocking member 148 are mounted on a base plate fixture 150 which is supported on the sensor housing 31 with the bolt 51 and a 54.

A detection method for detecting a steering torque by the torque sensor 120 and the ECU 112 will be described.

FIG. 10 is an exemplary diagram showing a positional relation between the first to fourth magnetic sensors 143A, 143B, 144A, 144B and the first magnet 141 when the first magnet 141 is viewed from the side of the second magnet 142 in a state in which the steering wheel 2 is in the neutral position and no steering torque is applied to the steering wheel 2. FIG. 11 is an exemplary diagram showing a positional relation between the first to fourth magnetic sensors 143A, 143B, 144A, 144B and the second magnet 142 when the second magnet 142 is viewed from the side of the first magnet 141 in a state in which the steering wheel 2 is in the neutral position and no steering torque is applied to the steering wheel 2.

In this embodiment, in a state in which the steering wheel 2 is in the neutral position and no steering torque is applied to the steering wheel 2, the relative positions of the magnetic poles of the first magnet 141 and the second magnet 142 differ in a state in which the steering wheel 2 is in the neutral position and no steering torque is applied to the steering wheel 2. Specifically, when the first magnet 141 and the second magnet 142 are viewed from the side of the steering wheel 2 in the state described above, the magnetic poles of the second magnet 142 shift 12° (60° in terms of electrical angle) in the counterclockwise direction (a direction indicated by an arrow A in FIG. 11) relative to the magnetic poles of the first magnet 141. When assuming that by the shifting of the magnetic poles of the first magnet 141 relative to the magnetic poles of the second magnet 142, the first and second magnetic sensors 143A, 143B are affected only by the magnetic force of the first magnet 141 and the third and fourth magnetic sensors 144A, 144B are affected only by the magnetic force from the second magnet 142, a rotational angle (corresponding to a first electrical angle θ1, which will be described later) of the first magnet 141 which is detected by the first and second magnetic sensors 143A, 143B in the state described above coincides with a rotational angle (corresponding to a second electrical angle θ2, which will be described later) of the second magnet 142 which is detected by the third and fourth magnetic sensors 144A, 144B.

When the input shaft 9 rotates clockwise direction as viewed from the side of an intermediate shaft 7, the first magnet 141 and the second magnet 142 also rotate clockwise in association with the clockwise rotation of the input shaft 9. In this case, when the first magnet 141 is viewed from the side of the first to fourth magnetic sensors 143A, 143B, 144A, 144B, the first magnet 141 rotates in a direction indicated by an arrow A in FIG. 10 (clockwise). On the other hand, when the second magnet 142 is viewed from the side of the first to fourth magnetic sensors 143A, 143B, 144A, 144B, the second magnet 142 rotates in a direction indicated by an arrow A in FIG. 11 (counterclockwise). Then, assuming that the directions indicated by the arrows A in FIGS. 10 and 11 represent a forward direction, it is understood that when the magnets 141, 142 are rotated in the forward direction, the rotational angles of the respective magnets 141, 142 increase, while when the magnets 141, 142 are rotated in a reverse direction, the rotational angles of the respective magnets 141, 142 decrease.

Since the first and second magnetic sensors 143A, 143B are prevented from being affected by the magnetic flux from the second magnet 142 by the magnetic blocking member 148, the first and second magnetic sensors 143A, 143B are affected only by the magnetic flux from the first magnet 141. Consequently, when the first magnet 141 is rotated, sine-wave signals whose phases shift 90 degrees from each other are outputted from the first magnetic sensor 143A and the second magnetic sensor 143B by magnetic flux generated from the magnetic poles of the first magnet 141. Here, assuming that the rotational angle (the electrical angle) of the first magnet 141 is θ1, it is understood that a first output signal V11, which is represented by V11=sin θ1, is outputted from the first magnetic sensor 143A, and a second output signal V12, which is represented by V12=cos θ1, is outputted from the second magnetic sensor 143B. However, the amplitudes of these signals V11, V12 are one. The rotational angle (the electrical angle) θ1 of the first magnet 141 is expressed by the following expression (101).

$$\theta 1 = \tan^{-1}(V11/V12) \tag{101}$$

The third and fourth magnetic sensors 144A, 144B are affected not only by the magnetic flux from the second magnet 142 but also by the magnetic flux from the first magnet 141. Consequently, a third and fourth output signals V13, V14 corresponding to a sum of the magnetic flux from the second magnet 142 and the magnetic flux of the first magnet 141 are outputted from the third magnetic sensor 144A and the fourth magnetic sensor 144B, respectively.

Assuming that the rotational angle (the electrical angle) of the second magnet 142 is θ2, a signal component V132 based only on the magnetic flux from the second magnet 142 which is contained in the third output signal V13 is expressed by the following expression (102), and a signal component V142 based only on the magnetic flux from the second magnet 142 which is contained in the fourth output signal V14 is expressed by the following expression (103). However, the amplitudes of the signal components are one.

$$V132 = \sin \theta 2 \tag{102}$$

$$V142 = \cos \theta 2 \tag{103}$$

A distance between the third magnetic sensor 144A and the fourth magnetic sensor 144B and the first magnet 141 is larger by an amount corresponding to the thickness of the sensor mounting base plate 147 than a distance between the third magnetic sensor 144A and the fourth magnetic sensor 144B and the second magnet 142. Therefore, an amount of magnetic flux of the first magnet 141 detected by the third magnetic sensor 144A and the fourth magnetic sensor 144B becomes smaller than an amount of magnetic flux of the second magnet 142 detected by the third magnetic sensor 144A and the fourth magnetic sensor 144B.

A ratio of the amount of magnetic flux of the first magnet 141 detected by the third magnetic sensor 144A and the fourth magnetic sensor 144B to the amount of magnetic flux of the second magnet 142 detected by the third magnetic sensor 144A and the fourth magnetic sensor 144B is defined as an attenuation coefficient k1. The attenuation coefficient k1 can be calculated from, for example, the previous measured value or the result of a simulation.

When the attenuation coefficient k1 is defined as described above, a signal component V131 based only on the magnetic flux from the first magnet 141 which is contained in the third output signal V13 is expressed by the following expression (104), and a signal component V141 based only on the magnetic flux from the first magnet 141 which is contained in the fourth output signal V14 is expressed by the following expression (105).

$$V131 = k1 \cdot \sin(\theta 1 - 600°) \tag{104}$$
$$= k1 \cdot \sin(\theta 1 + 120°)$$

$$V141 = k1 \cdot \cos(\theta 1 - 600°) \tag{105}$$
$$= k1 \cdot \cos(\theta 1 + 120°)$$

Consequently, the third output signal V13 and the fourth output signal V14 are expressed by the following expressions (106), (107), respectively.

$$V13 = V131 + V132 \tag{106}$$
$$= k1 \cdot \sin(\theta 1 + 120°) + \sin \theta 2$$

$$V14 = V134 + V142 \tag{107}$$
$$= k1 \cdot \cos(\theta 1 + 120°) + \cos \theta 2$$

The signal component V132 in which the influence of the magnetic flux from the first magnet 141 is removed from the third output signal V13 and the signal component V142 in which the influence of the magnetic flux from the first magnet 141 from the fourth output signal V14 are expressed by the following expressions (108), (109), respectively.

$$V132 = \sin \theta 2 \tag{108}$$
$$= V13 - k \cdot \sin(\theta 1 + 120°)$$

$$V142 = \cos \theta 2 \tag{109}$$
$$= V14 - k \cdot \cos(\theta 1 + 120°)$$

It should be noted that θ1 in the expressions (108), (109) is the rotational angle (the electrical angle) θ1 of the first magnet 141 which is calculated based on the expression (101). Additionally, sin (θ1+)120° can be obtained based on, for example, a map which stores sin (θ1+) 120° for θ1. Similarly, cos(θ1+) 120° can be obtained based on, for example, a map which stores cos(θ1+)120° for θ1.

The rotational angle (electrical angle) θ2 of the second magnet 142 is expressed by the following expression (110).

$$\theta 2 = \tan^{-1}(V132/V142) \tag{110}$$

The ECU 112 calculates a rotational angle (electrical angle) θ1 of the first magnet 141 from the first and second output signals V11, V12 by using the expression (101).

In addition, the ECU 112 calculates a rotational angle (electrical angle) θ2 of the second magnet 142 from the third and fourth output signals V13, V14, the attenuation coefficient k1 and the rotational angle θ1 of the first magnet 141 by using the expression (110). Specifically, the ECU 112 calculates V132 (=sin θ2) from the third output signal V13, the attenuation coefficient k1 and the rotational angle θ1 of the first magnet 141 based on the expression (108). In addition, the ECU 112 calculates V142 (=cos θ2) from the fourth output signal V14, the attenuation coefficient k1 and the rotational angle θ1 of the first magnet 141 based on the expression (109). Next, the ECU 112 calculates the rotational angle (electrical angle) θ2 of the second magnet 142 based on the expression (110).

Since no torsion is generated in the torsion bar 11 when no steering torque is applied to the input shaft 9, a rotational angle of the input shaft 9 from the neutral position and a rotational angle of the output shaft 10 from the neutral position are equal. Consequently, in this case, the first electrical angle θ1 and the second electrical angle θ2 become equal.

On the other hand, since torsion is generated in the torsion bar 11 when a steering torque is applied to the input shaft 9, an angle difference according to a torsional angle γ of the torsion bar 11 is generated between the rotational angle of the input shaft 9 from the neutral position and the rotational angle of the output shaft 10 from the neutral position. An absolute value of a maximum value of the torsional angle γ [deg] of the torsion bar 11 is smaller than a mechanical angle of 72 [deg] which corresponds to 360° in terms of electrical angle. Consequently, in this case, an angle difference according to the torsional angle γ of the torsion bar 11 is generated between the first electrical angle θ1 and the second electrical angle θ2.

Then, the ECU 112 subtracts the second electrical angle θ2 from the first electrical angle θ1 and calculates the torsional angle γ of the torsion bar 11 from the results of the subtraction. Specifically, the ECU 112 calculates the torsional angle (mechanical angle) γ of the torsion bar 11 based on the following expression (111).

$$\gamma = (\theta 1 - \theta 2)/5 \quad (111)$$

"5" in the expression (111) above represents the number of pairs of magnetic poles provided in each of the magnets 141, 142.

Finally, the ECU 112 calculates a steering torque T by multiplying the torsional angle γ by a spring constant K of the torsion bar 11. Namely, the ECU 112 calculates a steering torque T based on the following expression (112).

$$T = \gamma \times K = \{(\theta 1 - \theta 2)/5\} \times K \quad (112)$$

The ECU 112 performs a calculation like the one described above every predetermined calculation cycle to calculate a steering torque T every calculation cycle.

In this way, in the embodiment, the first to fourth magnetic sensors 143A, 143B, 144A, 144B are disposed between the first magnet 141 which is coupled to the input shaft 9 so as to rotate together therewith and the second magnet 142 which is coupled to the output shaft 10 so as to rotate together therewith. Consequently, the size of the input shaft 9 in the torque sensor 11 in a direction perpendicular to the axial direction thereof can be decreased.

Incidentally, it is considered that for example, two first shaft rotational angle detecting magnetic sensors are provided so that only the magnetic flux from the first magnet 141 can be detected so as to detect the rotational angle of the first magnet 141 (the rotational angle of the input shaft 9) and for example, two second shaft rotational angle detecting magnetic sensors are provided so that only the magnetic flux from the second magnet 142 can be detected so as to detect the rotational angle of the second magnet 142 (the rotational angle of the output shaft 10). Specifically, a rotational angle (electrical angle) of the input shaft 9 is calculated based on output signals of the two first shaft rotational angle detecting magnetic sensors which can detect only the magnetic flux from the first magnet 141. On the other hand, a rotational angle (electrical angle) of the output shaft 10 is calculated based on output signals of the two second shaft rotational angle detecting magnetic sensors which can detect only the magnetic flux from the second magnet 142. Then, a torsional angle of the torsion bar 11 is calculated based on a difference between the rotational angle of the input shaft 9 and the rotational angle of the output shaft 10.

In this case, it becomes necessary that the first shaft rotational angle detecting magnetic sensors are prevented from being affected by the magnetic flux from the second magnet 142 and the second shaft rotational angle detecting magnetic sensors are prevented from being affected by the magnetic flux from the first magnet 141.

Then, it is considered that the space between the first shaft rotational angle detecting magnetic sensors and the second magnet 142 is increased and the space between the second shaft rotational angle detecting magnetic sensors and the first magnet 141 is increased. However, in the event that this configuration is adopted, the axial size of the input shaft 9 in the torque detecting apparatus is increased.

Compared with the configuration described above, according to this embodiment, the axial size of the input shaft in the torque sensor can be decreased. Additionally, compared with the configuration of the first embodiment, only the single magnetic blocking member is provided. Therefore, the configuration can be simplified, and the axial size of the input shaft in the torque sensor can be more decreased.

In addition, in this embodiment, the first and second magnetic sensors 143A, 143B which detect the rotational angle of the input shaft 9 are mounted on the one surface (the first surface), and the third and fourth magnetic sensors 144A, 144B which detect the rotational angle of the output shaft 10 are mounted on the other surface (the first surface) of the sensor mounting base plate 147. By adopting this configuration, there is provided only the single base plate 1 on which the magnetic sensors are to be mounted, thereby making it possible to decrease the production cost.

It should be noted that the first and second magnetic sensors 143A, 143B and the third and fourth magnetic sensors 144A, 144B may be mounted on the one surface of the sensor mounting base plate 147.

In addition, in the embodiment, although the angular space between the first magnetic sensor 143A and the second magnetic sensor 143B and the angular space between the third magnetic sensor 144A and the fourth magnetic sensor 144B are set to 90° in terms of electric angle, the angular spaces may be set to other angles than 90°. In addition, in the embodiment, although the angular space between the first magnetic sensor 143A and the third magnetic sensor 144A and the angular space between the second magnetic sensor 143B and the fourth magnetic sensor 144B are set to 600° in terms of electrical angle, the angular spaces may be set to other than 600°.

Additionally, in the embodiment, although the magnetic blocking member 148 is provided which blocks the magnetic flux directed from the second magnet 142 towards the first and second magnetic sensors 143A, 143B, in place of the magnetic blocking member 148, a magnetic blocking member may be provided which blocks the magnetic flux directed from the first magnet 141 towards the third and fourth magnetic sensors 144A, 144B. As this occurs, the third and fourth magnetic sensors 144A, 144B detect only the magnetic flux from the second magnet 142, and the first and second magnetic sensors 143A, 143B detect only the magnetic flux which corresponds to a sum of the magnetic flux from the first magnet 141 and the magnetic flux from the second magnet 142.

Consequently, as this occurs, the rotational angle (electrical angle) θ2 of the output shaft 10 is calculated based on the output signals of the third and fourth magnetic sensors 144A, 144B. In addition, the signal components sin θ1, cos θ1 in which the influence of the magnetic flux from the second magnet 142 is removed are calculated from the output signals of the first and second magnetic sensors 143A, 143B based on the output signals of the first and second magnetic sensors 143A, 143B and the rotational angle θ2 of the output shaft 10. Then, the rotational angle (electrical angle) θ1 of the input shaft 9 is calculated based on the signal components sin θ1, cos θ1 obtained.

In the embodiment, in a state in which the steering wheel 2 is in the neutral position and no steering torque is applied to the steering wheel 2, the relative positions of the magnetic poles of the first magnet 141 and the second magnet 142 are set so that the first electrical angle θ1 calculated by the expression (101) and the second electrical angle θ2 calculated by the expression (110) coincide with each other in the state described above.

However, in the state described above, the relative positions of the magnetic poles of both the magnets 141, 142 may be set so that the first electrical angle θ1 calculated by the expression (101) and the second electrical angle θ2 calculated by the expression (110) do not coincide with each other in the state described above. Perhaps, in such a state, the relative positions of the magnetic poles of both the magnets 141, 142 may coincide with each other (for example, refer to FIGS. 5, 6 of the first embodiment). In such a case, a difference between the first electrical angle θ1 calculated by the expression (101) and the second electrical angle θ2 calculated by the expression (110) is obtained in advance, and a torsional angle γ of the torsion bar 11 should be calculated after either the first electrical angle θ1 or the second electrical angle θ2 which is calculated when the torque is calculated is corrected based on the difference obtained.

(Third Embodiment)

Next, a torque detecting apparatus according to a third embodiment of the invention will be described by reference to FIG. 1 and FIGS. 12 to 16.

As shown in FIG. 1, an electric power steering system 201 which includes a torque detecting apparatus of this embodiment includes an ECU 212 and a torque sensor 220. In FIG. 1, since the other configurations than the ECU 212 and the torque sensor 220 are similar to the other configurations than the ECU 12 and the torque sensor 20 of the electric power steering system 1 according to the first embodiment, like reference numerals will be given to like elements, and the description thereof will be omitted.

The torque sensor 220 is provided on the circumference of a steering shaft 6. The torque sensor 220 detects a steering torque applied to a steering wheel 2 (an input shaft 9) based on a relative rotational displacement between the input shaft 9 and an output shaft 10 which is caused by the torsion of a torsion bar 11. As will be described later, the torque sensor 220 includes four magnetic sensors 243A, 243B, 244A, 244B (refer to FIG. 14. Output signals of the respective magnetic sensors are inputted into the ECU (Electronic Control Unit) 212 which includes a microcomputer. The ECU 212 calculates a steering torque based on the output signals of the magnetic sensors. Consequently, the torque detecting apparatus includes the torque sensor 220 and the ECU 212. In addition, a vehicle speed which is detected by a vehicle speed sensor 23 is inputted into the ECU 212.

An electric motor 18 is controlled by the ECU 212. The ECU 212 controls the electric motor 18 based on a steering torque which is calculated based on an output signal of the torque sensor 220 and a vehicle speed which is detected by the vehicle speed sensor 23. Specifically, in the ECU 212, a target assist amount is determined by employing a map which stores relations between steering torque and target assist amount which are set for vehicle speeds, and an assist force produced by the electric motor 18 is controlled so as to approach the target assist amount.

Figure 12:
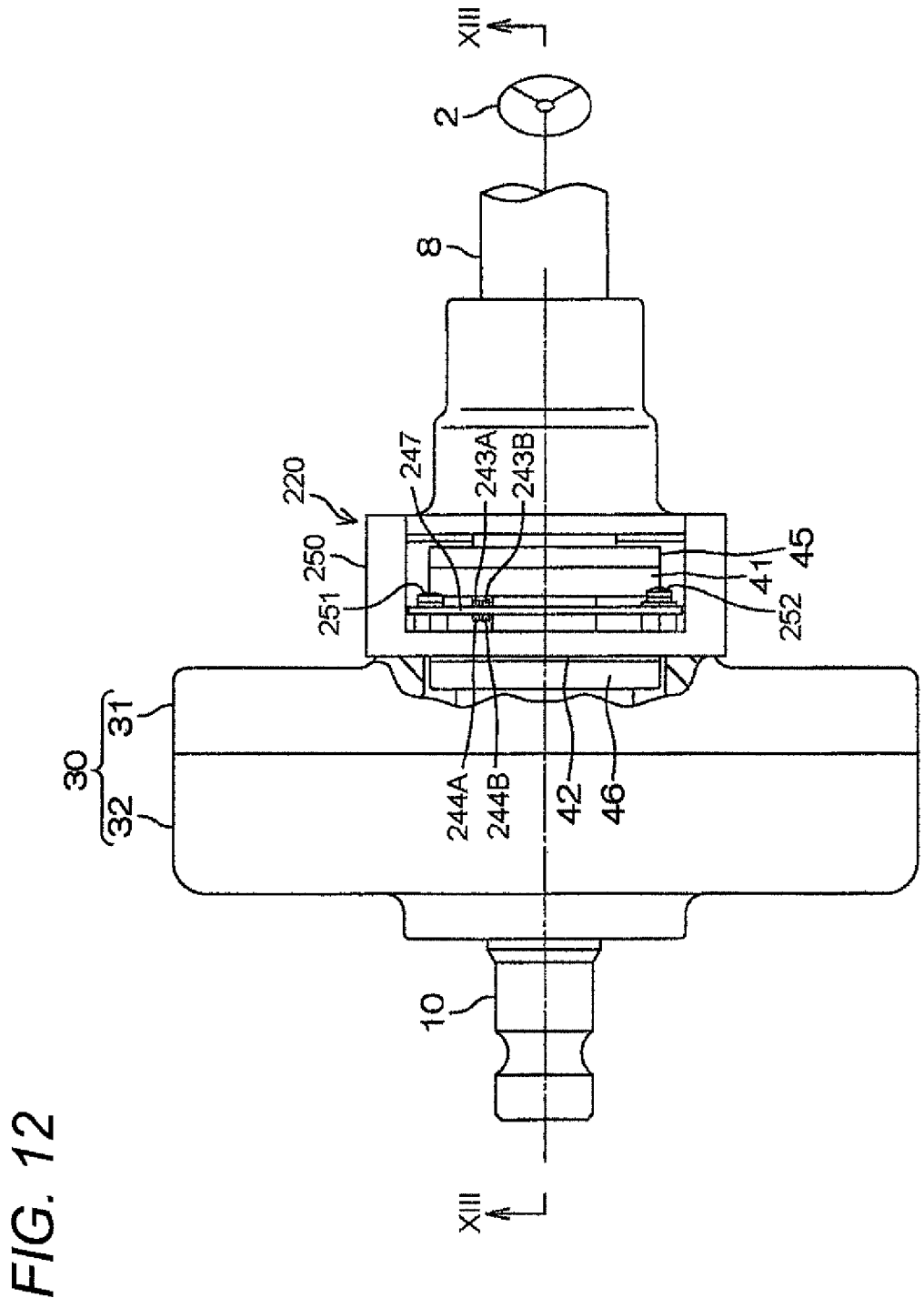
FIG. 12 is a partially cutaway plan view showing part of a torque sensor according to a third embodiment of the invention.
Figure 13:
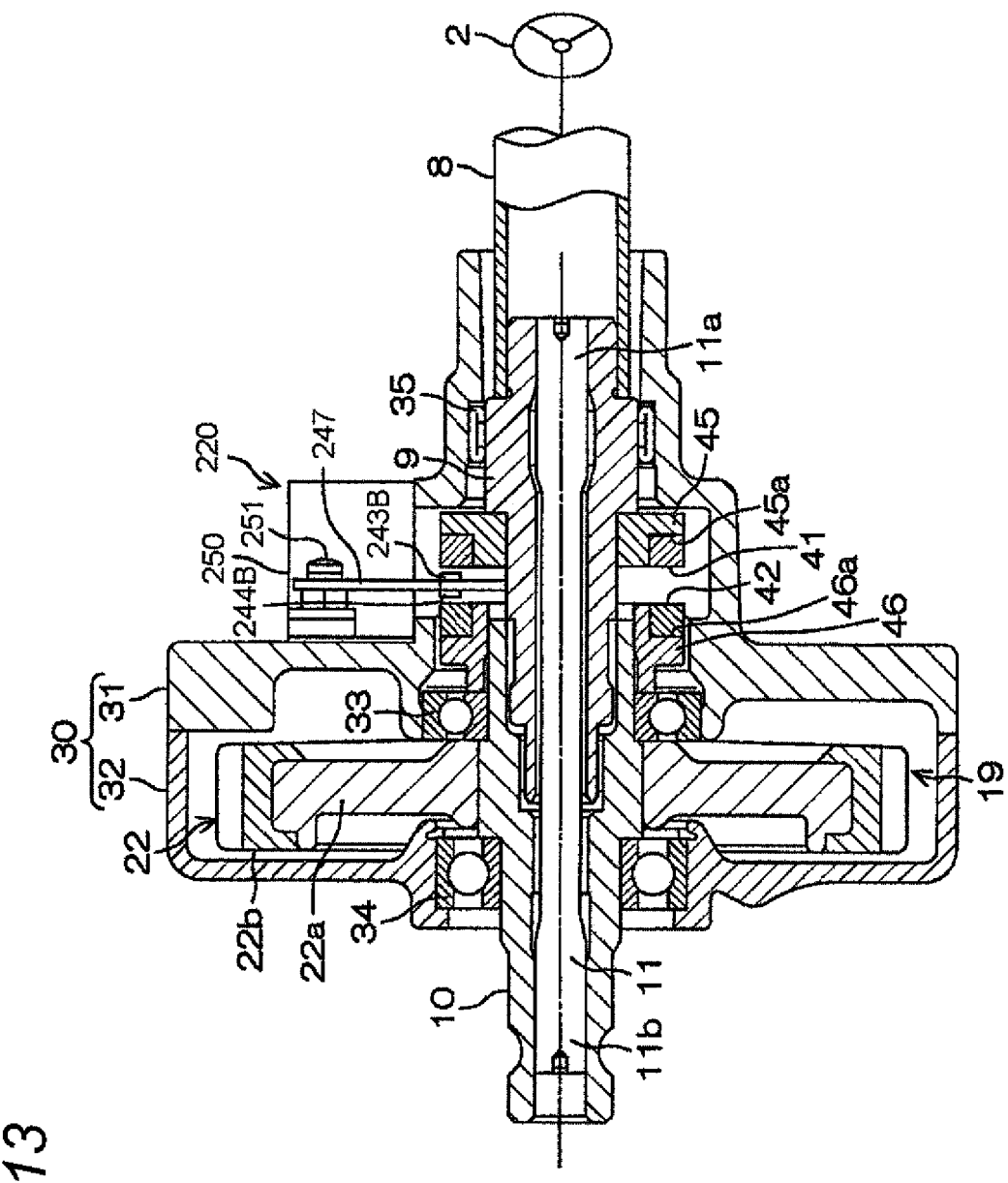
FIG. 13 is a sectional view taken along the line XIII-XIII in FIG. 12.
Figure 14:
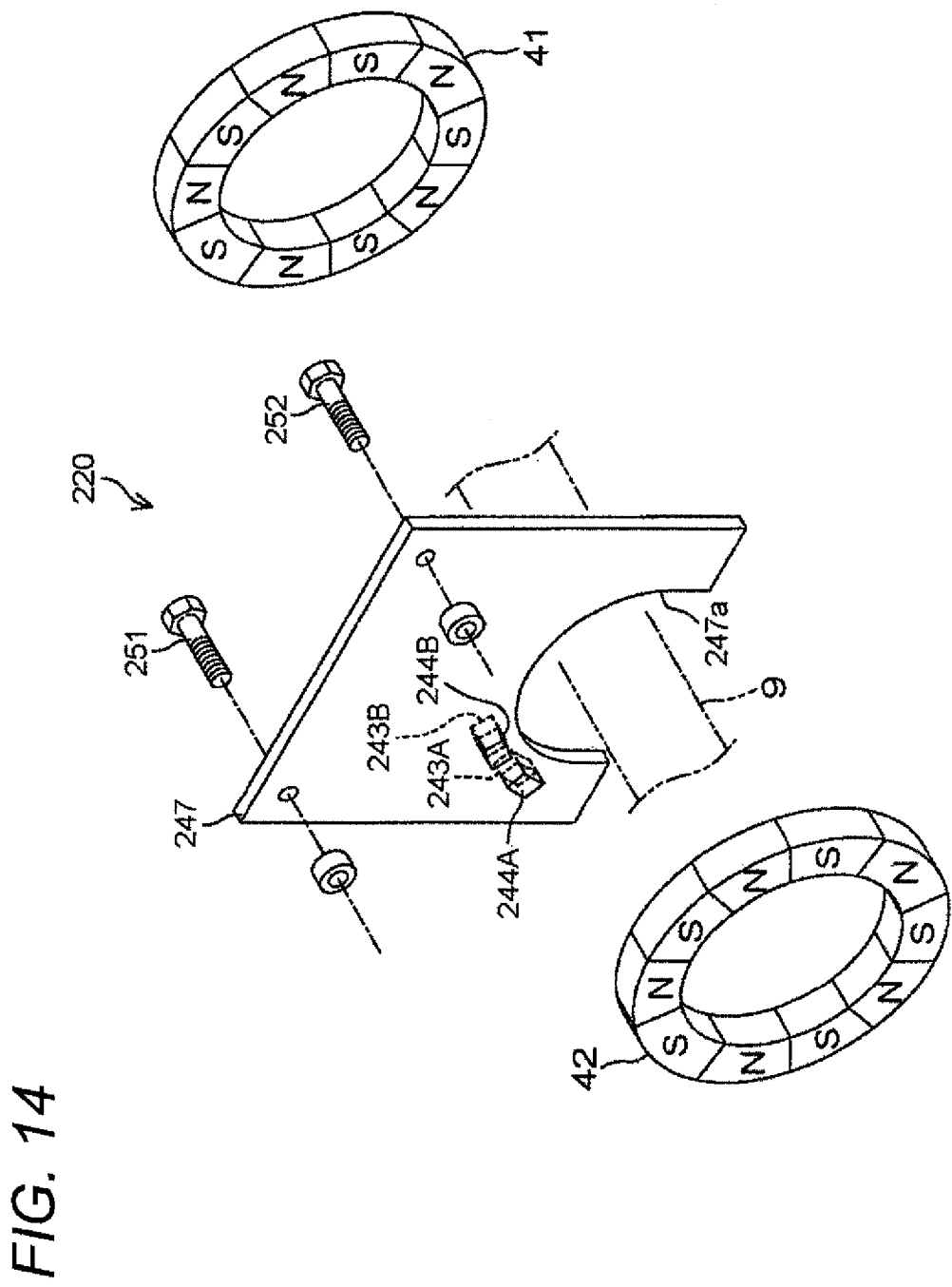
FIG. 14 is an exploded perspective view showing the torque sensor according to the third embodiment.

FIG. 12 is a partially cutaway plan view showing part of the torque sensor 220. FIG. 13 is a sectional view taken along the line XIII-XIII in FIG. 12. FIG. 14 is an exploded perspective view showing the torque sensor 220. In the following description, expressions related to upward direction denote an upper side of FIG. 13, and expressions related to downward direction denote a lower side of FIG. 13.

Referring to FIGS. 12 and 13, the torque sensor 220 is accommodated in a sensor housing 31 as so done in the first embodiment. The torque sensor 220 of this embodiment differs from the torque sensor 20 of the first embodiment mainly in that the magnetic blocking members 48, 49 in the first embodiment are not provided in the torque sensor 220. Hereinafter, the torque sensor 220 of this embodiment will be described in detail.

Referring to FIGS. 12 to 14, the torque sensor 220 includes a first annular magnet 41, a second annular magnet 42, a first magnetic sensor 243A and a second magnetic sensor 243B that are disposed between both the magnets 41, 42 and which faces the first magnet 41, and a third magnetic sensor 244A and a fourth magnetic sensor 244B that are disposed between both the magnets 41, 42 and which faces the second magnet 42. In this embodiment, Hall elements are used as the magnetic sensors 243A, 243B, 244A, 244B.

A sensor mounting base plate 247 is disposed between the first magnet 41 and the second magnet 42. The sensor mounting base plate 247 has the same shape as that of the sensor mounting base plate 47 in the first embodiment. As has been described above, however, the torque sensor 220 of this embodiment does not include the magnetic blocking members 48, 49 of the first embodiment. Therefore, the sensor mounting base plate 247 may be provided without the holes provided in the sensor mounting base plate 47 of the first embodiment through which the bolts are inserted to mount the magnetic blocking members 48, 49. The first magnetic sensor 243A and the second magnetic sensor 243B are mounted on a first surface of the sensor mounting base plate 247 which faces the first magnet 41. The third magnetic sensor 244A and the fourth magnetic sensor 244B are mounted on a second surface of the sensor mounting base plate 247 which faces the second magnet 42. Namely, the first to fourth magnetic sensors 243A, 243B, 244A, 244B are disposed between the first magnet 41 and the second magnet 42 (within a space sandwiched by the first magnet 41 and the second magnet 42).

When the second magnet 42 is viewed from the side of the first magnet 41, the first magnetic sensor 243A is disposed near a lower end of a right portion of the sensor mounting base plate 247, and the second magnetic sensor 243B is disposed apart an angular space of 90° in terms of electrical angle in a counterclockwise direction from the first magnetic sensor 243A. When the second magnet 42 is viewed from the side of the first magnet 41, the third magnetic sensor 244A is disposed directly behind the first magnetic sensor 243A across the sensor mounting base plate 247. In addition, when the second magnet 42 is viewed from the side of the first magnet 41, the fourth magnetic sensor 244B is disposed directly behind the second magnetic sensor 243B across the sensor mounting base plate 247.

Namely, the third magnetic sensor 244A is disposed on an extension of a line which connects a position on the first magnet 41 which the first magnetic sensor 243A faces and the first magnetic sensor 243A, and the fourth magnetic sensor 244B is disposed on an extension of a line which connects a position on the first magnet 41 which the second magnetic sensor 2433 faces and the second magnetic sensor 243B.

Additionally, a space between the first magnet 41 and the first magnetic sensor 243A and the second magnetic sensor 243B is equal to a space between the second magnet 42 and the third magnetic sensor 244A and the fourth magnetic sensor 244B.

The sensor mounting base plate 247 is mounted on a base plate fixture 250 which is supported on a sensor housing 31 with bolts 251, 252.

A detection method for detecting a steering torque by the torque sensor 220 and the ECU 212 will be described.

Figure 15:
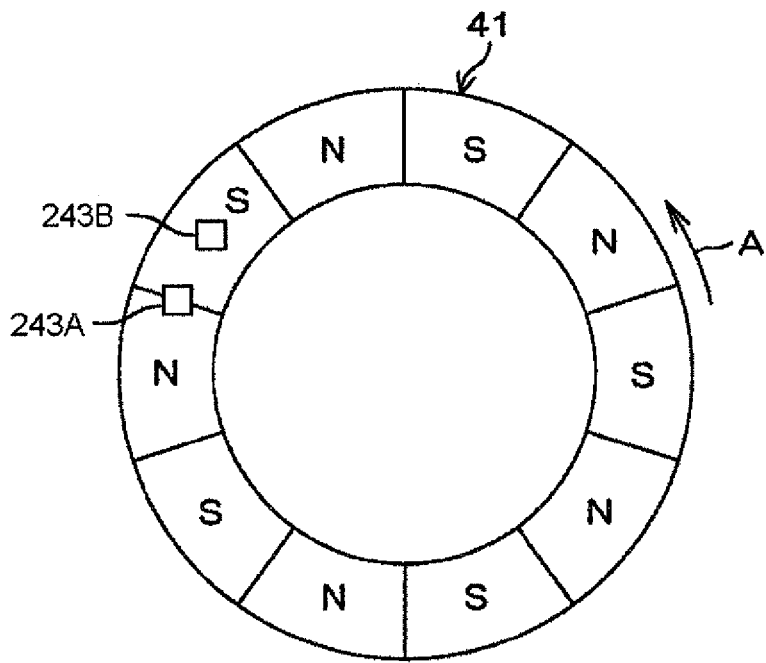
FIG. 15 is an exemplary diagram showing a positional relation between first and second magnetic sensors and a first magnet when the first magnet is viewed from the side of a sensor mounting base plate in a state in which a steering wheel is in a neutral position and no steering torque is applied to an input shaft in an electric power steering system including the torque sensor according to the third embodiment.
Figure 16:
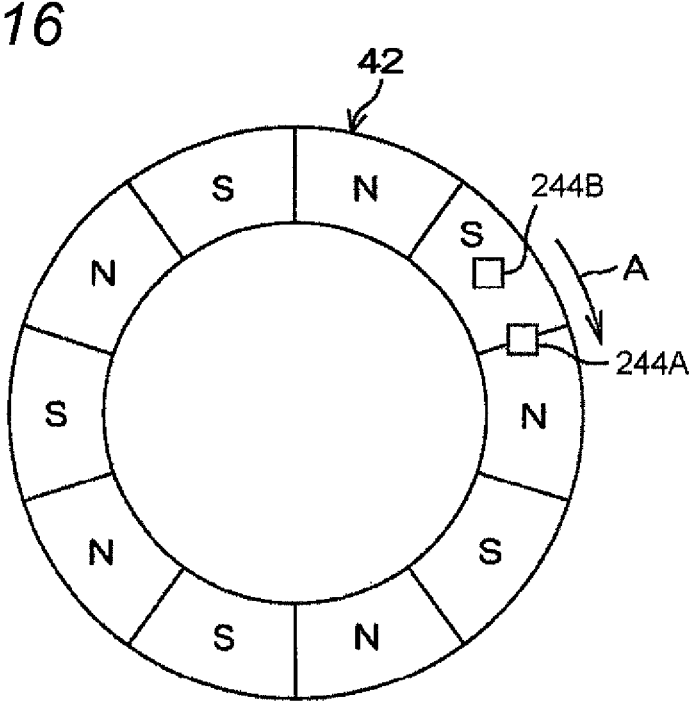
FIG. 16 is an exemplary diagram showing a positional relation between third and fourth magnetic sensors and a second magnet when the second magnet is viewed from the side of the sensor mounting base plate in a state in which the steering wheel is in the neutral position and no steering torque is applied to the input shaft in the electric power steering system including the torque sensor according to the third embodiment.

FIG. 15 is an exemplary diagram showing a positional relation between the first and second magnetic sensors 243A, 243B and the first magnet 41 when the first magnet 41 is viewed from the side of the sensor mounting base plate 247 in a state in which the steering wheel 2 is in a neutral position and no steering torque is applied to the steering wheel 2. FIG. 16 is an exemplary diagram showing a positional relation between the third and fourth magnetic sensors 244A, 244B and the second magnet 42 when the second magnet 42 is viewed from the side of the sensor mounting base plate 247 in a state in which the steering wheel 2 is in the neutral position and no steering torque is applied to the steering wheel 2.

The first magnet 41 and the second magnet 42 are fixed to the input shaft 9 and the output shaft 10, respectively, so that north magnetic poles of the first magnet 41 and north magnetic poles of the second magnet 42 face each other in a state in which the steering wheel 2 is in the neutral position and no steering torque is applied to the steering wheel 2. Consequently, in a state in which no torsion is generated in the torsion bar 11, the north magnetic poles of the first magnet 41 and the north magnetic poles of the second magnet 42 face each other.

When the input shaft 9 rotates clockwise when viewed from the side of the steering wheel 2, the first magnet 41 and the second magnet 42 also rotate clockwise in association with the clockwise rotation of the input shaft 9. In this case, when the first magnet 41 is viewed from the side of the first and second magnetic sensors 243A, 243B, the first magnet 41 rotates in a direction indicated by an arrow A in FIG. 15 (counterclockwise). On the other hand, when the second magnet 42 is viewed from the side of the third and fourth magnetic sensors 244A, 244B, the second magnet 42 rotates in a direction indicated by an arrow A in FIG. 16 (clockwise). Then, assuming that the directions indicated by the arrows A in FIGS. 15 and 16 represent a forward direction, it is understood that when the magnets 41, 42 are rotated in the forward direction, the rotational angles of the respective magnets 41, 42 increase, while when the magnets 41, 42 are rotated in a reverse direction, the rotational angles of the respective magnets 41, 42 decrease.

The first and second magnetic sensors 243A, 243B output first and second output signals V21, V22, respectively, corresponding to a sum of the magnetic flux from the first magnet 41 and the magnetic flux from the second magnet 42. Assuming that a rotational angle (electrical angle) of the first magnet 41 is $\theta 1$, a signal component based only on the magnetic flux from the first magnet 41 which is contained in the first output signal V21 becomes $\sin \theta 1$, and a signal component based only on the magnetic flux from the first magnet 41 which is contained in the second output signal V22 becomes $\cos \theta 1$. However, the amplitudes of the signal components are one.

The third and fourth magnetic sensors 244A, 244B output third and fourth output signals V23, V24, respectively, corresponding to a sum of the magnetic flux from the second magnet 42 and the magnetic flux from the first magnet 41. Assuming that a rotational angle (electrical angle) of the second magnet 42 is $\theta 2$, a signal component based only on the magnetic flux from the second magnet 42 which is contained in the third output signal V23 becomes $\sin \theta 2$, and a signal component of the fourth output signal V24 based only on the magnetic flux from the second magnet 42 becomes $\cos \theta 2$. However, the amplitudes of the signal components are one.

A distance between the first magnetic sensor 243A and the second magnetic sensor 243B and the second magnet 42 is larger by an amount corresponding to the thickness of the sensor mounting base plate 247 than a distance between the third magnetic sensor 244A and the fourth magnetic sensor 244B and the second magnet 42. Therefore, an amount of magnetic flux of the second magnet 42 detected by the first magnetic sensor 243A and the second magnetic sensor 243B becomes smaller than an amount of magnetic flux of the second magnet 42 detected by the third magnetic sensor 244A and the fourth magnetic sensor 244B. A ratio of the amount of magnetic flux from the second magnet 42 detected by the first magnetic sensor 243A and the second magnetic sensor 243B to the amount of magnetic flux from the second magnet 42 detected by the third magnetic sensor 244A and the fourth magnetic sensor 244B is defined as a first attenuation coefficient k21. The first attenuation coefficient k21 can be calculated by, for example, measuring a relation between a distance from the first magnet 41 and magnetic flux density based on the magnet 41 and dividing magnetic flux density corresponding to a distance between the first magnet 41 and the third magnetic sensor 244A by magnetic flux density corresponding to a distance between the first magnet 41 and the first magnetic sensor 243A.

Similarly, a ratio of the amount of magnetic flux from the first magnet 41 detected by the third magnetic sensor 244A and the fourth magnetic sensor 244B to the amount of magnetic flux from the first magnet 41 detected by the first magnetic sensor 243A and the second magnetic sensor 243B is defined as a second attenuation coefficient k22. The second attenuation coefficient k22 can be calculated by, for example, measuring a relation between a distance from the second magnet 42 and magnetic flux density based on the magnet 42 and dividing magnetic flux density corresponding to a distance between the second magnet 42 and the first magnetic sensor 243A by magnetic flux density corresponding to a distance between the second magnet 42 and the third magnetic sensor 244A.

Thus, when the attenuation coefficients k21, k22 are defined as has been described above, the signal component based only on the magnetic flux from the second magnet 42 which is contained in the first output signal V21 becomes $k21 \cdot \sin \theta 2$. The signal component based only on the magnetic flux from the second magnet 42 which is contained in the second output signal V22 becomes $k21 \cdot \cos \theta 2$. The signal component based only on the magnetic flux from the first magnet 41 which is contained in the third output signal V23 becomes $k22 \cdot \sin \theta 1$. The signal component based only on the magnetic flux from the first magnet 41 which is contained in the fourth output signal V24 becomes $k22 \cdot \cos \theta 1$.

Consequently, the first to fourth output signals V21 to V24 are expressed by the following expressions (201) to (204), respectively.

$$V21 = \sin\theta1 + k21\cdot\sin\theta2 \quad (201)$$

$$V22 = \cos\theta1 + k21\cdot\cos\theta2 \quad (202)$$

$$V23 = \sin\theta2 + k22\cdot\sin\theta1 \quad (203)$$

$$V24 = \cos\theta2 + k22\cdot\cos\theta1 \quad (204)$$

sin θ1 can be calculated from the expression (201) and the expression (203). Specifically, the following expression (205) can be obtained by calculating $(1/k21)\times V21-V23$.

$$(1/k21)\times V21 - V23 = (1/k21)\cdot\sin\theta1 + \sin\theta2 - \sin\theta2 - k22\cdot\sin\theta1 \quad (205)$$
$$= \{(1/k21) - k22\}\cdot\sin\theta1$$

The following expression (206) can be obtained by rearranging the above expression for sin θ1.

$$\sin\theta1 = \{(1/k21)\times V21 - V23\}/\{(1/k21) - k22\} \quad (206)$$

In addition, sin θ2 can be calculated from the expression (201) and the expression (203). Specifically, the following expression (207) can be obtained by calculating $(1/k22)\times V23-V21$.

$$(1/k22)\times V23 - V21 = (1/k22)\cdot\sin\theta2 + \sin\theta1 - \sin\theta1 - k21\cdot\sin\theta2 \quad (207)$$
$$= \{(1/k22) - k21\}\cdot\sin\theta2$$

The following expression (208) can be obtained by rearranging the above expression for sin θ2.

$$\sin\theta2 = \{(1/k22)\times V23 - V21\}/\{(1/k22) - k21\} \quad (208)$$

cos θ1 can be calculated from the expression (202) and the expression (204). Specifically, the following expression (209) can be obtained by calculating $(1/k21)\times V22-V24$.

$$(1/k21)\times V22 - V24 = (1/k21)\cdot\cos\theta1 + \cos\theta2 - \cos\theta2 - k22\cdot\cos\theta1 \quad (209)$$
$$= \{(1/k21) - k22\}\cdot\cos\theta1$$

The following expression (210) can be obtained by rearranging the above expression for cos θ1.

$$\cos\theta1 = \{(1/k21)\times V22 - V24\}/\{(1/k21) - k22\} \quad (210)$$

cos θ2 can be calculated from the expression (202) and the expression (204). Specifically, the following expression (211) can be obtained by calculating $(1/k22)\times V24-V22$.

$$(1/k21)\times V24 - V22 = (1/k22)\cdot\cos\theta2 + \cos\theta1 - \cos\theta1 - k21\cdot\cos\theta2 \quad (211)$$
$$= \{(1/k22) - k21\}\cdot\cos\theta2$$

The following expression (212) can be obtained by rearranging the above expression for cos θ2.

$$\cos\theta2 = \{(1/k22)\times V24 - V22\}/\{(1/k22) - k21\} \quad (212)$$

The rotational angle (electrical angle) θ1 of the input shaft 9 is expressed by the following expression (213).

$$\theta1 = \tan^{-1}\{\sin\theta1/\cos\theta1\} \quad (213)$$

-continued
$$= \{(1/k21)\times V21 - V23\}/\{(1/k21) - k22\} \div$$
$$\{(1/k21)\times V22 - V24\}/\{(1/k21) - k22\}$$

The rotational angle (electrical angle) θ2 of the output shaft 10 is expressed by the following expression (214).

$$\theta2 = \tan^{-1}\{\sin\theta2/\cos\theta2\} \quad (214)$$
$$= \{(1/k22)\times V23 - V21\}/\{(1/k22) - k21\} \div$$
$$\{(1/k22)\times V24 - V22\}/\{(1/k22) - k21\}$$

Since an absolute vale of a maximum value of the torsional angle γ [deg] is smaller than a mechanical angle of 72 [deg] which corresponds to the electrical angle of 360°, the torsional angle (mechanical angle) γ of the torsion bar 11 is expressed by the following expression (215).

$$\gamma = (\theta2 - \theta1)/5 \quad (215)$$

"5" in the expression (215) denotes the number of pairs of magnetic poles provided in each of the magnets 41, 42.

Assuming that the spring constant of the torsion bar 11 is K[Nm], the steering torque T is expressed by the following expression (216).

$$T = \gamma\times K \quad (216)$$

The attenuation coefficients k21, k22 and the spring constant K of the torsion bar 11 are stored in advance in a non-volatile memory within the ECU 12.

The ECU 12 captures the output signals V21, V22, V23, V24 of the magnetic sensors 243A, 243B, 244A, 244B every predetermined calculation cycle so as to calculate a steering torque T. Specifically, the ECU 212 calculates a steering torque T based on the output signals V21, V22, V23, V24 captured, the attenuation coefficients k21, k22, the spring constant K of the torsion bar 11 and the expressions (213) to (216).

In a state in which no torsion is generated in the torsion bar 11 due to an assembling error of the first magnet 41 and the second magnet 42, there exists a situation in which a predetermined angle difference Δθ is present between the rotational angle (electrical angle) θ1 of the input shaft 9 which is calculated based on the expression (213) and the rotational angle (electrical angle) θ2 of the output shaft 10 which is calculated based on the expression (214). As this occurs, the steering torque T is calculated as follows.

Assuming that a mechanical angle corresponding to the predetermined angle difference Δθ in a state in which no torsion is generated in the torsion bar 11 is β, this angle difference β is obtained at the time of production and is then stored in the non-volatile memory in the ECU 212.

Assuming that a mechanical angle corresponding to a difference between the rotational angle (electrical angle) θ1 of the first magnet 41 which is calculated by the expression (213) and the rotational angle (electrical angle) θ2 of the second magnet 42 which is calculated by the expression (214) is α (=(θ2−θ1)/5, α=β+γ results.

Then, the ECU 212 calculates a steering torque t based on the following expression (217).

$$T = \gamma\times K \quad (217)$$

-continued $$= (\alpha - \beta) \times K$$

$$= [\{(\theta2 - \theta1)/5\} - \beta] \times K$$

Namely, in this case, the ECU 212 calculates the steering torque T every calculation cycle based on the output signals V21, V22, V23, V24 captured, the attenuation coefficients k21, k22, the spring constant K of the torsion bar 11, the angle difference β and the expressions (213), (214), (217).

In this way, in the third embodiment, the first to fourth magnetic sensors 243A, 243B, 244A, 244B are disposed between the first magnet 41 which is coupled to the input shaft 9 so as to rotate together therewith and the second magnet 42 which is coupled to the output shaft 10 so as to rotate together therewith. Consequently, the size of the input shaft 9 in the torque sensor 11 in a direction perpendicular to the axial direction of the input shaft 9 can be decreased.

Consequently, when compared this embodiment with the first embodiment and the second embodiment, since the magnetic blocking members 48, 49 or the magnetic sensor 148 is unnecessary, not only can the configuration of the torque sensor be simplified, but also the axial size of the input shaft in the torque sensor can be decreased.

In addition, in the third embodiment, the first and second magnetic sensors 243A, 243B are mounted on the one surface (the first surface), and the third and fourth magnetic sensors 244A, 244B are mounted on the other surface (the second surface) of the sensor mounting base plate 247. By adopting this configuration, there is provided only the single base plate on which the magnetic sensors are to be mounted, thereby making it possible to realize a reduction in production cost.

Although the Hall elements are used as the magnetic sensors 43A, 43B, 44A, 44B, the magnetic sensors 143A, 143B, 144A, 144B, and the magnetic sensors 243A, 243B, 244A, 244B in the first to third embodiments, other elements than Hall elements such as magnetic resistant elements (MR elements) may be used, provided that the elements have properties in which electrical properties are changed by the action of magnetic field.

This invention can also be applied to other systems than the electric power steering system.

In addition, various design changes can be made without departing from matters described under claims.

According to the embodiments of the invention, the torque detecting apparatus described, for example, under (1) to (9) below can be provided. It should be noted that although parenthesized numerals represent the corresponding constituent elements in the embodiments, the scope of the invention is not limited to the embodiments.

(1) According to this aspect, there is provided a torque detecting apparatus for detecting a torque applied to a first shaft (9), based on a relative rotational displacement between the first shaft and a second shaft (10) caused by torsion in a coupling shaft (11) which couples the first shaft and the second shaft, including: a first magnet (41, 141) which is coupled to the first shaft so as to rotate together with the first shaft; a second magnet (42, 142) which is coupled to the second shaft so as to rotate together with the second shaft; and a plurality of magnetic sensors (43A, 43B, 44A, 44B, 143A, 143B, 144A, 144B, 243A, 243B, 244A, 244B) which are disposed between the first magnet and the second magnet and which detect a rotational angle of the first shaft and a rotational angle of the second shaft based on magnetic flux from the first magnet.

According to this configuration, the torsional angle of the coupling shaft can be calculated based on output signals of the plurality of magnetic sensors. From this, the torque applied to the first shaft can be calculated.

In addition, in this configuration, since the plurality of magnetic sensors are disposed between the first magnet and the second magnet, the size of the first shaft in the torque detecting apparatus in the direction perpendicular to the axial direction thereof can be decreased.

(2) According to this aspect, there is provided the torque detecting apparatus according to the aspect (1), wherein the plurality of magnetic sensors include: a plurality of first shaft rotational angle detecting magnetic sensors (43A, 43B, 143A, 143B) which detect the rotational angle of the first shaft based on magnetic flux from the first magnet; and a plurality of second shaft rotational angle detecting magnetic sensors (44A, 44B, 144A, 144B) which detect the rotational angle of the second shaft based on magnetic flux from the second magnet.

According to this configuration, the rotational angle (electrical angle) of the first shaft can be detected based on output signals of the plurality of first shaft rotational angle detecting magnetic sensors. On the other hand, the rotational angle (electrical angle) of the second shaft can be detected based on output signals of the plurality of second shaft rotational angle detecting magnetic sensors. Then, a torsional angle of the coupling shaft can be calculated based on the rotational angle of the first shaft and the rotational angle of the second shaft. From this, the torque applied to the first shaft can be calculated.

Additionally, in this configuration, since the first shaft rotational angle detecting magnetic sensors are disposed between the first magnet and the second magnet and the second shaft rotational angle detecting magnetic sensors are disposed between the first magnet and the second magnet, the size of the first shaft in the torque detecting apparatus in the direction perpendicular to the axial direction thereof can be decreased.

(3) According to this aspect, there is provided the torque detecting apparatus according to the aspect (2), further including: a sensor mounting base plate (47, 147) which includes a first surface facing the first magnet and a second surface facing the second magnet, and which is disposed between the first magnet and the second magnet, wherein the first shaft rotational angle detecting magnetic sensors are mounted on one surface of the first surface and the second surface, and the second shaft rotational angle detecting magnetic sensors are mounted on the other surface thereof.

In this configuration, since the first shaft rotational angle detecting magnetic sensors are mounted on the one surface and the second shaft rotational angle detecting magnetic sensors are mounted on the other surface of the sensor mounting base plate, there is provided only the single base plate on which the magnetic sensors are to be mounted. This can decrease the production cost.

(4) According to this aspect, there is provided the torque detecting apparatus according to the aspect (3), wherein the first shaft rotational angle detecting magnetic sensors are mounted on the first surface, and wherein the second shaft rotational angle detecting magnetic sensors are mounted on the second surface of the sensor mounting base plate.

In this configuration, since the first shaft rotational angle detecting magnetic sensors are mounted on the first surface of the sensor mounting base plate which faces the first magnet, the magnetic flux from the first magnet is easy to be detected by the first shaft rotational angle detecting magnetic sensors. By this configuration, the accuracy with which the rotational angle of the first shaft is detected can be increased. On the other hand, since the second shaft rotational angle detecting magnetic sensors are mounted on the second surface of the sensor mounting base plate which faces the second magnet, the magnetic flux from the second magnet is easy to be detected by the second shaft rotational angle detecting magnetic sensors. By this configuration, the accuracy with which the rotational angle of the second shaft is detected can be increased.

(5) According to this aspect, there is provided the torque detecting apparatus according to any of the aspects (1) to (4), wherein a first magnetic blocking member (48) which blocks the magnetic flux directed from the second magnet towards the first shaft rotational angle detecting magnetic sensors is disposed between the first shaft rotational angle detecting magnetic sensors and the second shaft, and a second magnetic blocking member (49) which blocks the magnetic flux directed from the first magnet towards the second shaft rotational angle detecting magnetic sensors is disposed between the second shaft rotational angle detecting magnetic sensors and the first magnet.

Since the first shaft rotational angle detecting magnetic sensors detect the rotational angle of the first shaft based on the magnetic flux from the first magnet, it is preferable that the first shaft rotational angle detecting magnetic sensors are prevented from being affected by the magnetic flux from the second magnet. Similarly, since the second shaft rotational angle detecting magnetic sensors detect the rotational angle of the second shaft based on the magnetic flux from the first magnet, it is preferable that the second shaft rotational angle detecting magnetic sensors are prevented from being affected by the magnetic flux from the first magnet. Then, it is considered that the space between the first shaft rotational angle detecting magnetic sensors and the second magnet is increased and that the space between the second shaft rotational angle detecting magnetic sensors and the first magnet is increased. However, in case this configuration is adopted, the axial size of the input shaft in the torque detecting apparatus is increased.

In the configuration above, since the first magnetic blocking member which blocks the magnetic flux directed from the second magnet towards the first shaft rotational angle detecting magnetic sensors is disposed between the first shaft rotational angle detecting magnetic sensors and the second magnet, the space between the first shaft rotational angle detecting magnetic sensors and the second magnet can be decreased. In addition, the second magnetic blocking member which blocks the magnetic flux directed from the first magnet towards the second shaft rotational angle detecting magnetic sensors is disposed between the second shaft rotational angle detecting magnetic sensors and the first magnet, the space between the second shaft rotational angle detecting magnetic sensors and the first magnet can be decreased. By adopting this configuration, the axial size of the input shaft in the torque detecting apparatus can be decreased.

(6) According to this aspect, there is provided the torque detecting apparatus according to the aspect (1) or (4), wherein the plurality of magnetic sensors include: a plurality of first shaft rotational angle detecting magnetic sensors (143A, 143B) each of which detects magnetic flux from the first magnet; and a plurality of second shaft rotational angle detecting magnetic sensors (144A, 144B) each of which detects magnetic flux corresponding to a sum of the magnetic flux from the first magnet and magnetic flux from the second magnet, and wherein the torque detecting apparatus further includes: a magnetic blocking member (148) which blocks the magnetic flux directed from the second magnet towards the first shaft rotational angle detecting magnetic sensors; an extracting unit (112) which extracts a signal component in which influence of the magnetic flux from the first magnet is removed from output signals of the respective second shaft rotational angle detecting magnetic sensors based on output signals of the first shaft rotational angle detecting magnetic sensors and the output signals of the second shaft rotational angle detecting magnetic sensors; a first calculating unit (112) which calculates the rotational angle of the first shaft based on the output signals of the first shaft rotational angle detecting magnetic sensors; a second calculating unit (112) which calculates the rotational angle of the second shaft based on the signal component extracted by the extracting unit; and a torque calculating unit (112) which calculates the torque applied to the first shaft or the second shaft based on the rotational angle of the first shaft which is calculated by the first calculating unit and the rotational angle of the second shaft which is calculated by the second calculating unit. As discussed in more detail herein, the extracting unit, the first calculating unit, the second calculating unit and the torque calculating unit may form part of the ECU 112 or the ECU 112 may be configured to perform the operations of these units. As such, the extracting unit, the first calculating unit, the second calculating unit and the torque calculating unit may be identified by the same reference numeral "112" as the ECU 112.

The signal component in which the influence of the magnetic flux from the first magnet is removed is extracted from the output signals of the respective second shaft rotational angle detecting magnetic sensors based on the output signals of the first shaft rotational angle detecting magnetic sensors. In addition, the rotational angle (electrical angle) of the second shaft is calculated based on the signal component so extracted. On the other hand, the rotational angle (electrical angle) of the first shaft is detected based on the output signals of the first shaft rotational angle detecting magnetic sensors. Then, the torque applied to the first shaft or the second shaft is calculated based on the rotational angle of the first shaft and the rotational angle of the second shaft.

In this configuration, since the first shaft rotational angle detecting magnetic sensors are disposed between the first magnet and the second magnet and the second shaft rotational angle detecting magnetic sensors are disposed between the first magnet and the second magnet, the size of the first shaft in the torque detecting apparatus in the direction perpendicular to the axial direction thereof can be decreased.

Incidentally, it is considered that a plurality of first shaft rotational angle detecting magnetic sensors are provided so that only the magnetic flux from the first magnet can be detected so as to detect the rotational angle of the first magnet (the rotational angle of the first shaft) and a plurality of second shaft rotational angle detecting magnetic sensors are provided so that only the magnetic flux from the second magnet can be detected so as to detect the rotational angle of the second magnet (the rotational angle of the second shaft). In this case, it is necessary that the first shaft rotational angle detecting magnetic sensors are prevented from being affected by the magnetic flux from the second magnet and the second shaft rotational angle detecting magnetic sensors are prevented from being affected by the magnetic flux from the first magnet.

Then, it is considered that the space between the first shaft rotational angle detecting magnetic sensors and the second shaft is increased and the space between the second shaft rotational angle detecting magnetic sensors and the first magnet is increased. However, in the event that this configuration is adopted, the axial size of the input shaft in the torque detecting apparatus is increased.

In the torque detecting apparatus according to this aspect, the axial size of the first shaft in the torque detecting apparatus can be decreased compared with the configuration described above. Additionally, only the single magnetic blocking member is provided. Therefore, the configuration can be simplified, and the axial size of the input shaft in the torque detecting apparatus can be more decreased. This can realize a reduction in production cost.

(7) According to this aspect, there is provided the torque detecting apparatus according to the aspect (1), wherein the plurality of sensors include: first and second magnetic sensors (243A, 243B) which are disposed so as to face the first magnet, and which output first and second output signals (V21, V22), respectively, corresponding to a sum of magnetic flux from the first magnet and magnetic flux from the second magnet; and third and fourth magnetic sensors (244A, 244B) which are disposed between the first magnet and the second magnet so as to face the second magnet, and which output third and fourth output signals (V23, V24), respectively, corresponding to a sum of the magnetic flux from the second magnet and the magnetic flux from the first magnet, wherein the third magnetic sensor is disposed on an extension of a line which connects a position on the first magnet where the first magnetic sensor faces and the first magnetic sensor, wherein the fourth magnetic sensor is disposed on an extension of a line which connects a position on the first magnet where the second magnetic sensor faces and the second magnetic sensor, and wherein the torque detecting apparatus further includes: a first signal component calculating unit (212) which calculates a first signal component (sin θ1) in which influence of the magnetic flux from the second magnet is removed from the first output signal, and which calculates a third signal component (sin θ2) in which influence of the magnetic flux from the first magnet is removed from the third output signal, based on the first output signal and the third output signal; a second signal component calculating unit (212) which calculates a second signal component (cos θ1) in which the influence of the magnetic flux from the second magnet is removed from the second output signal, and which calculates a fourth signal component (cos θ2) in which the influence of the magnetic flux from the first magnet is removed from the fourth output signal, based on the second output signal and the fourth output signal; and a torque calculating unit (212) which calculates the torque applied to the first shaft by using the first to fourth signal components. As discussed in more detail herein, the first signal component calculating unit, the second signal component calculating unit and the torque calculating unit may form part of the ECU 212 or the ECU 212 may be configured to perform the operations of these units. As such, the first signal component calculating unit, the second signal component calculating unit and the torque calculating unit may be identified by the same reference numeral "212" as the ECU 212.

In this configuration, the first signal component (sin θ1) in which the influence of the magnetic flux from the second magnet is removed from the first output signal is calculated and the third signal component (sin θ2) in which the influence of the magnetic flux from the first magnet is removed from the third output signal is calculated based on the first output signal and the third output signal. In addition, the second signal component (cos θ1) in which the influence of the magnetic flux from the second magnet is removed from the second output signal is calculated, and the fourth signal component (cos θ2) in which the influence of the magnetic flux from the first magnet is removed from the fourth output signal is calculated based on the second output signal and the fourth output signal. Then, the torque applied to the first shaft is calculated by using the first to fourth signal components.

According to this configuration, since the first and second magnetic sensors are disposed between the first magnet and the second magnet so as to face the first magnet and the third and fourth magnetic sensors are disposed so as to face the second magnet, the size of the first shaft in the torque detecting apparatus in the direction perpendicular to the axial direction thereof can be decreased.

According to this torque detecting apparatus, since the magnetic blocking members are unnecessary, can the configuration be simplified, but also the axial size of the first shaft in the torque detecting apparatus can be decreased.

(8) According to this aspect, there is provided the torque detecting apparatus according to the aspect (7), wherein a sensor mounting base plate (247) which includes a first surface facing the first magnet and a second surface facing the second magnet is disposed between the first magnet and the second magnet, and wherein the first and second magnetic sensors are mounted on the first surface of the sensor mounting base plate, and the third and fourth magnetic sensors are mounted on the second surface of the sensor mounting base plate.

In this configuration, since the first shaft rotational angle detecting magnetic sensors are mounted on the one surface and the second shaft rotational angle detecting magnetic sensors are mounted on the other surface of the sensor mounting base plate, there is provided only the single base plate on which the magnetic sensors are to be mounted, whereby the production cost can be reduced.

(9) According to this aspect, there is provided the torque detecting apparatus according to the aspect (7) or (8), wherein the torque calculating unit calculates the torque (T) applied to the first shaft by using the rotational angle (θ1) of the first shaft calculated from the first signal component and the second signal component, the rotational angle (θ2) of the second shaft calculated from the third signal component and the fourth signal component, and a spring constant (K) of the coupling shaft.

In this configuration, the torsional angle (γ) of the coupling shaft can be calculated based on the rotational angle (θ1) of the first shaft which is calculated from the first signal component and the second signal component and the rotational angle (θ2) of the second shaft which is calculated from the third signal component and the fourth signal component. Then, the torque (T) applied to the first shaft can be calculated by multiplying the torsional angle (γ) of the coupling shaft by the spring constant (K) of the coupling shaft.

(10) According to this aspect, there is provided the torque detecting apparatus according to the aspect (7) or (8), wherein the torque calculating unit calculates the torque (T) applied to the first shaft by using the rotational angle (θ1) of the first shaft calculated from the first signal component and the second signal component, the rotational angle (θ2) of the second shaft calculated from the third signal component and the fourth signal component, an angle difference (β), which is set in advance, between the rotational angle of the first shaft and the rotational angle of the second shaft in a state in which no torsion is generated in the coupling shaft, and a spring constant (K) of the coupling shaft which is set in advance.

Even in a state in which no torsion is generated in the coupling shaft due to an assembling error of the first magnet and the second magnet, there are fears that the angle difference (β) is generated between the rotational angle (θ1) of the first shaft which is calculated from the first signal component and the second signal component and the rotational angle (θ2)

of the second shaft which is calculated from the third signal component and the fourth signal component.

In this configuration, the torsional angle (γ) of the coupling shaft can be calculated based on the rotational angle (θ1) of the first shaft which is calculated from the first signal component and the second signal component, the rotational angle (θ2) of the second shaft which is calculated from the third signal component and the fourth signal component, and the angle difference (β) which results between the rotational angle of the first shaft and the rotational angle of the second shaft in a state in which no torsion is generated in the coupling shaft. Then, the torque (T) applied to the first shaft can be calculated by multiplying the torsional angle (γ) of the coupling shaft by the spring constant (K) of the coupling shaft.

According to this configuration, also when there exists the angle difference (β) between the rotational angle of the first shaft and the rotational angle of the second shaft in a state in which no torsion is generated in the coupling shaft, the torsional angle (γ) of the coupling shaft can be calculated accurately, thereby making it possible to increase the accuracy with which the torque (T) is calculated. Description of Reference Numerals

DESCRIPTION OF REFERENCE SIGNS

9: Input Shaft (First Shaft)
10: Output Shaft (Second Shaft)
11: Torsion Bar
41: First Magnet
42: Second Magnet
43a, 43b, 44a, 44b: Magnetic Sensor
47: Sensor Mounting Base Plate
48, 49: Magnetic Blocking Member
12: ECU
141: First Magnet
142: Second Magnet
143a, 143b, 144a, 144b: Magnetic Sensor
147: Sensor Mounting Base Plate
148: Magnetic Blocking Member
112: ECU
243a, 243b, 244a, 244b: Magnetic Sensor
247: Sensor Mounting Base Plate
212: ECU

The invention claimed is:

1. A torque detecting apparatus for detecting a torque applied to a first shaft, based on a relative rotational displacement between the first shaft and a second shaft caused by torsion in a coupling shaft which couples the first shaft and the second shaft, said torque detecting apparatus comprising:
a first magnet which is coupled to the first shaft so as to rotate together with the first shaft;
a second magnet which is coupled to the second shaft so as to rotate together with the second shaft; and
a plurality of magnetic sensors which are disposed between the first magnet and the second magnet and which detect a rotational angle of the first shaft and a rotational angle of the second shaft,
wherein the plurality of magnetic sensors comprise:
a plurality of first shaft rotational angle detecting magnetic sensors which detect the rotational angle of the first shaft based on magnetic flux from the first magnet; and
a plurality of second shaft rotational angle detecting magnetic sensors which detect the rotational angle of the second shaft based on magnetic flux from the second magnet,
wherein a first magnetic blocking member which blocks the magnetic flux directed from the second magnet towards the first shaft rotational angle detecting magnetic sensors is disposed between the first shaft rotational angle detecting magnetic sensors and the second magnet,
wherein a second magnetic blocking member which blocks the magnetic flux directed from the first magnet towards the second shaft rotational angle detecting magnetic sensors is disposed between the second shaft rotational angle detecting magnetic sensors and the first magnet, and
wherein the first and second magnetic blocking members are mounted on a surface of a sensor mounting base opposite to a surface of the sensor mounting base to which the plurality of magnetic sensors are mounted, each of the first and second magnetic blocking members extending only partially circumferentially around one of the first or second shafts.

2. The torque detecting apparatus according to claim 1, wherein the first and second magnetic blocking members extend around different circumferential portions of the first or second shaft.

3. A torque detecting apparatus for detecting a torque applied to a first shaft, based on a relative rotational displacement between the first shaft and a second shaft caused by torsion in a coupling shaft which couples the first shaft and the second shaft, said torque detecting apparatus comprising:
a first magnet which is coupled to the first shaft so as to rotate together with the first shaft;
a second magnet which is coupled to the second shaft so as to rotate together with the second shaft; and
a plurality of magnetic sensors which are disposed between the first magnet and the second magnet and which detect a rotational angle of the first shaft and a rotational angle of the second shaft,
wherein the plurality of magnetic sensors comprise:
a plurality of first shaft rotational angle detecting magnetic sensors each of which detects magnetic flux from the first magnet; and
a plurality of second shaft rotational angle detecting magnetic sensors each of which detects magnetic flux formed according to a sum of the magnetic flux from the first magnet and magnetic flux from the second magnet, and
wherein said torque detecting apparatus further comprises:
a magnetic blocking member which blocks the magnetic flux directed from the second magnet towards the first shaft rotational angle detecting magnetic sensors, wherein the magnetic blocking member is mounted on a surface of a sensor mounting base opposite to a surface of the sensor mounting base to which the first shaft rotational angle detecting magnetic sensor is mounted, the magnetic blocking member extending only partially circumferentially around one of the first or second shafts; and
an Electronic Control Unit (ECU) comprising:
an extracting unit which extracts a signal component in which influence of the magnetic flux from the first magnet is removed from output signals of the respective second shaft rotational angle detecting magnetic sensors based on output signals of the first shaft rotational angle detecting magnetic sensors and the output signals of the second shaft rotational angle detecting magnetic sensors;
a first calculating unit which calculates the rotational angle of the first shaft based on the output signals of the first shaft rotational angle detecting magnetic sensors;

a second calculating unit which calculates the rotational angle of the second shaft based on the signal component extracted by the extracting unit; and a torque calculating unit which calculates the torque applied to the first shaft or the second shaft based on the rotational angle of the first shaft which is calculated by the first calculating unit and the rotational angle of the second shaft which is calculated by the second calculating unit.

4. A torque detecting apparatus for detecting a torque applied to a first shaft, based on a relative rotational displacement between the first shaft and a second shaft caused by torsion in a coupling shaft which couples the first shaft and the second shaft, said torque detecting apparatus comprising:

a first magnet which is coupled to the first shaft so as to rotate together with the first shaft;

a second magnet which is coupled to the second shaft so as to rotate together with the second shaft; and a plurality of magnetic sensors which are disposed between the first magnet and the second magnet and which detect a rotational angle of the first shaft and a rotational angle of the second shaft, wherein the plurality of magnetic sensors comprise:

first and second magnetic sensors which are disposed so as to face the first magnet, and which output first and second output signals, respectively, corresponding to a sum of magnetic flux from the first magnet and magnetic flux from the second magnet; and third and fourth magnetic sensors which are disposed between the first magnet and the second magnet so as to face the second magnet, and which output third and fourth output signals, respectively, corresponding to a sum of the magnetic flux from the second magnet and the magnetic flux from the first magnet, wherein the third magnetic sensor is disposed on an extension of a line which connects a position on the first magnet where the first magnetic sensor faces and the first magnetic sensor, wherein the fourth magnetic sensor is disposed on an extension of a line which connects a position on the first magnet where the second magnetic sensor faces and the second magnetic sensor, and wherein said torque detecting apparatus further includes an Electronic Control Unit (ECU) comprising:

a first signal component calculating unit which calculates a first signal component in which influence of the magnetic flux from the second magnet is removed from the first output signal, and which calculates a third signal component in which influence of the magnetic flux from the first magnet is removed from the third output signal, based on the first output signal and the third output signal;

a second signal component calculating unit which calculates a second signal component in which the influence of the magnetic flux from the second magnet is removed from the second output signal, and which calculates a fourth signal component in which the influence of the magnetic flux from the first magnet is removed from the fourth output signal, based on the second output signal and the fourth output signal; and a torque calculating unit which calculates the torque applied to the first shaft by using the first to fourth signal components.

5. The torque detecting apparatus according to claim 4, wherein a sensor mounting base plate which includes a first surface facing the first magnet and a second surface facing the second magnet is disposed between the first magnet and the second magnet, and wherein the first and second magnetic sensors are mounted on the first surface of the sensor mounting base plate, and the third and fourth magnetic sensors are mounted on the second surface of the sensor mounting base plate.

6. The torque detecting apparatus according to claim 4, wherein the torque calculating unit calculates the torque applied to the first shaft by using the rotational angle of the first shaft calculated from the first signal component and the second signal component, the rotational angle of the second shaft calculated from the third signal component and the fourth signal component, and a spring constant of the coupling shaft.

7. The torque detecting apparatus according to claim 4, wherein the torque calculating unit calculates the torque applied to the first shaft by using the rotational angle of the first shaft calculated from the first signal component and the second signal component, the rotational angle of the second shaft calculated from the third signal component and the fourth signal component, an angle difference, which is set in advance, between the rotational angle of the first shaft and the rotational angle of the second shaft in a state in which no torsion is generated in the coupling shaft, and a spring constant of the coupling shaft which is set in advance.

* * * * *